(12) United States Patent
Yu et al.

(10) Patent No.: US 11,576,088 B2
(45) Date of Patent: Feb. 7, 2023

(54) METHOD AND APPARATUS FOR HANDLING CONNECTIONS

(71) Applicant: ZTE Corporation, Guangdong (CN)

(72) Inventors: Yuanfang Yu, Guangdong (CN); Sergio Parolari, Guangdong (CN); Ting Lu, Guangdong (CN); Yin Gao, Guangdong (CN); Fei Lu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/008,534

(22) Filed: Aug. 31, 2020

(65) Prior Publication Data

US 2021/0337434 A1    Oct. 28, 2021

Related U.S. Application Data

(63) Continuation of application No. 16/194,231, filed on Nov. 16, 2018, now Pat. No. 10,764,795, which is a (Continued)

(30) Foreign Application Priority Data

| May 16, 2016 | (CN) | 201610326708.5 |
| May 19, 2016 | (CN) | 201610338823.4 |
| May 25, 2016 | (CN) | 201610356646.2 |

(51) Int. Cl.
*H04W 36/00* (2009.01)
*H04W 76/19* (2018.01)
(Continued)

(52) U.S. Cl.
CPC ....... *H04W 36/0033* (2013.01); *H04W 76/10* (2018.02); *H04W 76/19* (2018.02); *H04W 92/20* (2013.01); *Y02D 30/70* (2020.08)

(58) Field of Classification Search
CPC ......... H04W 36/0022; H04W 36/0033; H04W 76/10; H04W 76/19; H04W 92/20;
(Continued)

(56) References Cited

U.S. PATENT DOCUMENTS

| 7,925,762 B1 | 4/2011 | Kauppinen et al. |
| 9,295,095 B2 | 3/2016 | Rayavarapu |

(Continued)

OTHER PUBLICATIONS

Extended European Search Report dated Apr. 13, 2022 for European Patent Application No. 21212804.5, (9 pages).
(Continued)

*Primary Examiner* — Allahyar Kasraian
(74) *Attorney, Agent, or Firm* — Perkins Coie LLP

(57) ABSTRACT

The embodiments of the present disclosure provide a method and an apparatus for connection handling. The method includes: receiving a connection request that requests for establishing or resuming a connection with a base station; and instructing a Non-Access Stratum (NAS) of a terminal to perform a predetermined operation based on an obtained first connection result corresponding to the connection request. In this way, the problems associated with inconsistent operations in the user plane optimization in the related art can be solved and the consistency in operations between the Access Stratum (AS) and NAS of the terminal can be achieved.

14 Claims, 11 Drawing Sheets

Related U.S. Application Data continuation of application No. PCT/CN2017/084579, filed on May 16, 2017.

(51) Int. Cl.
*H04W 76/10* (2018.01)
*H04W 92/20* (2009.01)

(58) Field of Classification Search
CPC .......... H04W 72/0413; H04W 72/042; H04W 72/0406; H04W 76/27; H04W 36/08; H04W 76/30; H04W 36/0079; H04W 48/02; H04W 48/08
See application file for complete search history.

(56) References Cited

U.S. PATENT DOCUMENTS

| | | | |
|---|---|---|---|
| 10,764,795 B2 | 9/2020 | Yu et al. | |
| 2012/0232742 A1 | 9/2012 | Elliott et al. | |
| 2013/0012204 A1* | 1/2013 | Kim ..................... | H04W 60/06 455/435.1 |
| 2015/0131526 A1 | 5/2015 | Noldus et al. | |
| 2015/0201453 A1 | 7/2015 | Roeland et al. | |
| 2016/0374005 A1* | 12/2016 | Cho ........................ | H04W 8/02 |
| 2017/0332431 A1* | 11/2017 | Kim ................... | H04W 72/048 |
| 2018/0227843 A1 | 8/2018 | Wu | |
| 2019/0021134 A1* | 1/2019 | Zhang ............... | H04W 36/0033 |
| 2019/0037629 A1 | 1/2019 | Ryu et al. | |
| 2019/0104455 A1 | 4/2019 | Park et al. | |
| 2019/0141776 A1* | 5/2019 | Kim ..................... | H04W 76/27 |

OTHER PUBLICATIONS

Ericsson: "RRC Resume AS-NAS interaction", 3GPP TSG-RAN WG2 #93bis; Tdoc R2-162865, Dubrovnik, Croatia, 6 pages, Apr. 11-15, 2016.
LG Electronics: "UE internal NAS-AS interaction to perform RRC Connection Resume Procedure", 3GPP, TSG CT WG1 Meeting #97, Ljubljana (Slovenia), C1-161884, 5 pages, Apr. 11-15, 2016.
CATT: "Handling of resume failure in Radio interface", 3GPP TSG RAN3 Meeting #92, Nanjing, China, R3-161113, 4 pages, May 23-27, 2016.
Chinese Office Action dated Jul. 13, 2020 for Chinese Patent Application No. 201610356646.2, filed on May 25, 2016 (23 pages).
Communication to Article 94(3) EPC dated Sep. 30, 2020 for European Application No. 17798717.9, filed on May 16, 2017 (7 pages).
International Search Report and Written Opinion dated Jul. 26, 2017 for International Application No. PCT/CN2017/084579, filed on May 16, 2017 (6 pages).

\* cited by examiner

Transmit a first downlink message and/or a first resumption identification to a terminal — S1202

FIG. 12

First Receiving Module — 132

Instructing Module — 134

FIG. 13

Second Receiving Module — 142

First Transmitting Module — 144

FIG. 14

METHOD AND APPARATUS FOR HANDLING CONNECTIONS

CROSS REFERENCE TO RELATED APPLICATIONS

This application is a continuation of and claims priority to U.S. patent application Ser. No. 16/194,231, filed on Nov. 16, 2018, which is a continuation of International Application No. PCT/CN2017/084579, filed on May 16, 2017, which claims the benefit of priority of Chinese Patent Application No. 201610326708.5, filed on May 16, 2016, Chinese Patent Application No. 201610338823.4, filed on May 19, 2016, and Chinese Patent Application No. 201610356646.2, filed on May 25, 2016. The entire content of the before-mentioned patent applications are incorporated by reference as part of the disclosure of this application. The entire contents of the before-mentioned patent applications are incorporated by reference as part of the disclosure of this application.

TECHNICAL FIELD

The present disclosure relates to communication technology, and more particularly, to a method and an apparatus for connection handling.

BACKGROUND

Machine Type Communication (MTC) is currently an important research topic in the 5th Generation (5G) mobile communication technology and an important application area in future wireless communications. In Machine-to-Machine (M2M) topic, a research sub-topic of Narrow Band—Internet of Things (NB-IoT) has been proposed for characteristics of terminals such as low cost, low power consumption, low mobility and low throughput. That is, low-throughput wireless communication services can be provided for low-cost NB-IoT terminals (or User Equipment (UE)) within a 200 KHz frequency band.

In order to reduce signaling overhead and power consumption at NB-IoT terminals, two optimization schemes for Cellular Internet of Things (CIoT), have been introduced in the current researches.

1. Control Plane (CP) Optimization Scheme: No Data Radio Bearer (DRB) and no access stratum (AS) security context will be established between a terminal and a network. Data is encapsulated into non-access stratum (NAS) Protocol Data Unit (PDU) and attached to CP signaling for transmission. This scheme can significantly save signaling but has a limited data packet length for each transmission. A large data packet has to be partitioned into a number of small packets for transmission. In case of a poor coverage, such packets can be lost, such that a receiver cannot receive a complete data packet.

2. User Plane (UP) Optimization Scheme: A complete connection is established between a terminal and a network and data is transmitted using DRBs. After completion of data transmission, a bearer information context and an AS security context can be maintained at the terminal and the network side in a suspending process. For a subsequent data transmission, the terminal and the network resume the maintained contexts in a resumption process to continue transmitting data using the DRB. This scheme is substantially the same as the existing process and has no significant limitation on the data packet length. However, it has a limited effect in saving signaling.

Further, a process for negotiating capabilities between a terminal and a network has been introduced by the current research. Preferred Network Behavior indication information can be carried in an Attach Request message, indicating operation schemes the terminal can support and would recommend. A network element Mobility Management Entity (MME) at the network side will include Supported Network Behavior in an Attach Accept message for indicating operation schemes the network can support.

When the UP scheme is adopted for the terminal-network negotiation, when the terminal has uplink data to send, it needs to trigger a resumption process for air interface and network-side bearers. When the network side has downlink data to send, it will page the terminal first and then trigger the terminal to initiate a resumption process for air interface and network-side bearers.

In the up-to-date standard, for the connection resumption process in the UP optimization scheme, a Non-Access Stratum (NAS) of a terminal, in an idle state with a suspension flag, sends an instruction to resume a connection to an Access Stratum (AS) of the terminal and buffers a NAS signaling for service request. The AS of the terminal will attempt to transmit a connection resumption request message to an AS of a base station. In this scenario, there can be several possible operations and interactions in the NASs and ASs of the base station and the terminal, as follows.

1. Normally, upon receiving the connection resumption request message, the AS of the base station will transmit a connection resumption message to the terminal, indicating that the connection has been successfully resumed for the terminal. The AS of the terminal then sends an indication to the NAS of the terminal, indicating that the connection has been successfully resumed (i.e., "RRC connection has been resumed"). The NAS of the terminal will discard the buffered NAS signaling for service request and terminate the NAS process.

2. There can also be the following scenarios which can be considered as abnormal.

a) In some cases, the AS of the terminal can not transmit the connection resumption request message for failing to pass an Access Baring test. In this case, the AS of the terminal sends an indication to the NAS of the terminal, indicating a failure to resume the connection (i.e., "failure to resume"). The NAS of the terminal can reuse or refer to the processes for connection establishment failure (i.e., "failure to establish") and congestion control.

b) In some other cases, the AS of the terminal can not transmit the connection resumption request message because the current serving base station does not support the UP optimization scheme. In this case, the AS of the terminal will clear the stored AS context and send an indication to the NAS of the terminal, indicating a failure to resume the connection (i.e., "RRC connection resumption has failed"). The NAS of the terminal will send the buffered NAS signaling for service request to the AS, which then performs a normal connection establishment process.

c) In some other cases, if some abnormality occurs after the AS of the base station has received the connection resumption request message, e.g., when the AS of the base station fails to find a context associated with a terminal resumption ID, the AS of the base station can also transmit a connection establishment message to the terminal, instructing the terminal to clear the buffered contexts and perform a normal connection establishment. In this case, the AS of the terminal will send an indication to the NAS of the terminal, indicating a failure to resume the connection (i.e., "RRC connection resumption has failed"). The NAS of the terminal will send the buffered NAS signaling for service request to the AS, which then performs subsequent processes and transmits the NAS signaling to the base station for establishing a S1 interface later.

d) In some other cases, after receiving the connection resumption request message, the AS of the base station can transmit a connection rejection message to the terminal, e.g., due to network congestion. Alternatively, the terminal can not receive any response to the connection resumption request message due to an abnormality in a radio link, which causes timeout of timer T300. In either case, the AS of the terminal sends an indication to the NAS of the terminal, indicating a failure to resume the connection (i.e., "failure to resume"). The NAS of the terminal can reuse or refer to the processes for connection establishment failure (i.e., "failure to establish") and congestion control. Additionally, the connection rejection message transmitted from the AS of the base station to the terminal can optionally include suspension information. If the suspension information is included, the AS of the terminal will maintain the stored AS context information; otherwise the AS of the terminal will clear the stored AS context.

There can be the following problems associated with the above processes and interactions.

1. In the current standard, when the NAS of the terminal receives a "failure to resume" indication, the NAS of the terminal can reuse or refer to the processes for connection establishment failure and congestion control. That is, the NAS of the terminal does not distinguish between "failure to establish" and "failure to resume". When the terminal makes a connection resumption request, the NAS of the terminal is in an idle state with a suspension flag. If the terminal receives a "failure to resume" indication at this time, it needs to consider at least how to handle the stored NAS context (including the suspension flag). On one hand, the NAS of the terminal can clear the suspension flag and return to a normal idle state. On the other hand, the NAS of the terminal can alternatively stop the current process and maintain the current state.

2. Further, in the case where the AS of the terminal receives a connection rejection message, it is different from the existing rule that an extended wait timer is applied only to terminals supporting delay-tolerable access. If the current terminal is a NB-IoT terminal, its AS always sends the extended wait timer to its NAS, such that it can be applied at the NAS. However, conventionally, the NAS will determine whether the terminal is currently initiating a low-priority access when handling the timer. If so, the NAS will start the timer and wait for a period of time (i.e., starting a timer T3346 with the "extended wait time" value); otherwise it will discard the timer. That is, currently the use of the extended wait timer by the NAS of the terminal is conditional. If the condition is not met, the requirement that the AS shall apply extended wait timers to all connection rejection scenarios for NB-IoT terminals can not be satisfied.

3. Further, in a special case where the AS of the terminal receives a connection rejection message that carries the suspension information, the AS of the terminal will maintain the stored context information. If at this time the NAS of the terminal receives a "failure to resume" indication from the AS, clears the suspension flag and returns to the normal idle state, there will be inconsistency between the AS and NAS of the terminal. On the other hand, in a special case where the AS of the terminal receives a connection rejection message that carries no suspension information, the AS of the terminal will clear the stored NAS context. If at this time the NAS of the terminal receives a "failure to resume" indication from the AS, stops the current process and maintains the current state, there will be another type of inconsistency between the AS and NAS of the terminal. When the NAS of the terminal sends an instruction to resume the connection to the AS of the terminal subsequently, the AS cannot proceed with subsequent process as it does not have any AS context stored therein.

4. In addition to the scenarios described above, the standard does not very clearly specify the AS operations and the AS-NAS interactions when other abnormalities occurs at the AS of the terminal during the connection resumption process, such as reestablishment failure due to Radio Link Failure (RLF) or timeout of timers other than T300.

The problematic AS-NAS interactions as described above can lead to problems such as inconsistent operations between the AS and the NAS.

For the connection resumption process in the UP optimization scheme, before the terminal triggers the resumption process, it is assumed that various context information required for the UP optimization have already been stored in the terminal, base station and related core network elements. It is important problem to be solved regarding how to identify the context information such that the terminal and the network side can use consistent identifications to search for and resume the correct context information. In the up-to-date standard, a 40-bit full-text resume identity has been defined. This full-text resume identity is allocated by the base station to the terminal during the suspending process. In accordance with the instruction from the network side, the terminal can carry the 40-bit full-text resume identity or a 24-bit truncated resume identity in the connection resumption request message and transmit it to the base station.

However, the above scheme for transmitting the resume identity has the following problems.

1. In the up-to-date standard, the base station shall construct the 40-bit full-text resume identity in a format containing 20-bit base station information and 20-bit terminal/user information. In a simplest way, the base station can place the 20-bit terminal/user information in the 20 Most Significant Bits (MSBs) of the full-text resume identity and the 20-bit base station information in the 20 Least Significant Bits (LSBs), or vice versa. However, if the base station adopts another, flexible construction scheme, the terminal would not be able to know information on the specific format of the 40-bit full-text resume identity. For example, the terminal would not be able to know whether the 20-bit terminal/user information is placed in the MSBs, LSBs or somewhere in the middle of the 40-bit full-text resume identity.

2. On the other hand, in accordance with the instruction from the network-side, the terminal can determine to transmit a 24-bit truncated resume identity to the base station. In a simplest way, the base station can extract the 24 MSBs from the 40-bit full-text resume identity, meaning that the 20-bit terminal/user information and 4 bits of the base station information are used to construct the truncated resume identity. However, if the terminal requires a more flexible scheme, e.g., requiring more base station information to be carried in the resume identity in e.g., a mobility scenario, the terminal cannot notify the base station of the specific format of the 24-bit resume identity, e.g., whether to include 20 bits or less of the base station information, whether to include 20 bits or less of the terminal/user information, or whether to include other information. In other words, the standard cannot provide such flexibility in transmission of the resume identity.

Hence, the transmission of the resume identity can lead to problems such as inconsistent interpretation or lack of flexibility.

There is currently no effective solution in the related art to the problems associated with inconsistent operations in the UP optimization.

SUMMARY

The embodiments of the present disclosure provide a method and an apparatus for connection handling, capable of solving at least the problems associated with inconsistent operations in the UP optimization in the related art.

According to an embodiment of the present disclosure, a method for connection handling is provided. The method includes: receiving a connection request that requests for establishing or resuming a connection with a base station; and instructing a Non-Access Stratum (NAS) of a terminal to perform a predetermined operation based on an obtained first connection result corresponding to the connection request.

Optionally, the step of instructing the NAS of the terminal to perform the predetermined operation based on the obtained first connection result includes: transmitting to the NAS of the terminal one or more first indication messages carrying indication information; transmitting to the NAS of the terminal the one or more first indication messages carrying the indication information and a second indication message indicating a second connection result; and transmitting to the NAS of the terminal a third indication message indicating the second connection result and carrying the indication information. The indication information instructs the NAS of the terminal to perform the predetermined operation.

Optionally, the indication information includes at least one of:

a suspension retention indication for instructing one of: the NAS to retain a suspension flag, the NAS to clear the suspension flag, the NAS to be in an idle state with the suspension flag, the NAS to be in an idle state without the suspension flag, the NAS to enter the idle state with the suspension flag, the NAS to enter the idle state without the suspension flag, the NAS to maintain the idle state with the suspension flag, and the NAS to leave the idle state with the suspension flag;

a Narrow Band Internet of Things (NB-IoT) terminal type indication for indicating to the NAS that the terminal is or is not an NB-IoT terminal;

a NAS signaling handling indication for instructing the NAS to or not to send a buffered NAS signaling to an Access Stratum (AS) of the terminal;

a connection resumption failure indication for instructing the NAS to send the buffered NAS signaling to the AS of the terminal and to enter a connected state;

a connection suspension indication for instructing the NAS to enter the idle state with the suspension flag;

a base station supporting Control Plane (CP) optimization indication indicating whether a base station supports a CP optimization scheme or not; and a base station supporting User Plane (UP) optimization indication indicating whether a base station supports a UP optimization scheme or not.

Optionally, when the suspension retention indication has a first predetermined value, the suspension retention indication instructs one of: the NAS to retain the suspension flag, the NAS to be in an idle state with the suspension flag, the NAS to enter the idle state with the suspension flag, and the NAS to maintain the idle state with the suspension flag. When the suspension retention indication has a second predetermined value, the suspension retention indication instructs one of: the NAS to clear the suspension flag, the NAS to be in an idle state without the suspension flag, the NAS to enter the idle state without the suspension flag, and the NAS to leave the idle state with the suspension flag.

Optionally, the first predetermined value is 1 or "failure to resume with suspend", and the second predetermined value is 0 or "failure to resume without suspend".

Optionally, the first connection result includes one of: the AS of the terminal being unable to transmit a connection resumption request message for failing to pass an Access Barring test, the AS of the terminal receiving a connection rejection message carrying suspension information, the AS of the terminal receiving a connection rejection message carrying no suspension information, the AS of the terminal receiving a reestablishment rejection message carrying suspension information, timeout of a timer started after the AS of the terminal has transmitted a Message 3, "Msg3", the AS of the terminal being unable to transmit a connection resumption request message as a current serving base station does not support the UP optimization scheme, and the AS of the terminal being unable to transmit a connection resumption request message as there is no AS context information stored.

Optionally, the NB-IoT terminal type indication indicates to the NAS that the terminal is an NB-IoT terminal when the NB-IoT terminal type indication has a third predetermined value, and the NB-IoT terminal type indication indicates to the NAS that the terminal is not an NB-IoT terminal when the NB-IoT terminal type indication has a fourth predetermined value.

Optionally, the NB-IoT terminal type indication has a 1-bit value, and the third predetermined value is 1 and the fourth predetermined value is 0.

Optionally, the first connection result includes: the AS of the terminal transferring an extended wait timer to the NAS after receiving a connection rejection message.

Optionally, the NAS signaling handling indication instructs the NAS to send the buffered NAS signaling to the AS of the terminal when the NAS signaling handling indication has a fifth predetermined value, and/or the NAS signaling handling indication instructs the NAS to enter the connected. The NAS signaling handling indication instructs the NAS not to send the buffered NAS signaling to the AS of the terminal when the NAS signaling handling indication has a sixth predetermined value.

Optionally, the NAS signaling handling indication has a 1-bit value, and the fifth predetermined value is 1 and the sixth predetermined value is 0.

Optionally, the first connection result includes one of: the AS of the terminal being unable to transmit a connection resumption request message as a current serving base station does not support the UP optimization scheme, and the AS of the terminal being unable to transmit a connection resumption request message as there is no AS context information stored.

Optionally, the method further includes, after receiving the connection request: recording the connection request as a connection establishment request or a connection resumption request, depending on a request type of the connection request.

Optionally, the second indication message or the third indication message includes a resumption failure indication, "failure to resume".

Optionally, the third indication message includes one of: "failure to resume with suspend" and "failure to resume without suspend".

Optionally, the second connection result includes one of: a connection resumption failure, "failure to resume the RRC connection", and a connection establishment failure, "failure to establish the RRC connection".

According to another embodiment of the present disclosure, a method for connection handling is provided. The method includes: receiving a first downlink message and/or a first resume identity transmitted from a first base station; and transmitting an uplink message and/or a second resume identity to a second base station based on the first resume identity.

Optionally, the first downlink message carries information indicating a format of the first resume identity transmitted from the first base station.

Optionally, the information indicating the format of the first resume identity includes: information indicating a meaning of information carried in the first resume identity and information indicating a length of the information carried in the first resume identity.

Optionally, the first downlink message includes information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the method further includes: obtaining, based on the two of the first predetermined length, the second predetermined length and the third predetermined length included in the first downlink message, the other one of the first predetermined length, the second predetermined length and the third predetermined length.

Optionally, the uplink message carries information indicating a format of the second resume identity transmitted to the second base station.

Optionally, the information indicating the format of the second resume identity includes: information indicating a meaning of information carried in the second resume identity and information indicating a length of the information carried in the second resume identity.

Optionally, the uplink message includes information indicating at least two of: a total length of the second resume identity being a fourth predetermined length, a length of base station information carried in the second resume identity being a fifth predetermined length, and a length of terminal information carried in the second resume identity being a sixth predetermined length.

Optionally, the uplink message includes two of the fourth predetermined length, the fifth predetermined length and the sixth predetermined length, and the method further includes: obtaining, based on the two of the fourth predetermined length, the fifth predetermined length and the sixth predetermined length included in the uplink message, the other one of the fourth predetermined length, the fifth predetermined length and the sixth predetermined length.

Optionally, the step of transmitting the second resume identity to the second base station based on the first resume identity includes: extracting, from the base station information having the second predetermined length in the first resume identity, information having the fifth predetermined information according to a first predetermined rule as the base station information in the second resume identity; extracting, from the terminal information having the third predetermined length in the first resume identity, information having the sixth predetermined information according to a second predetermined rule as the terminal information in the second resume identity; and transmitting the second resume identity to the second base station.

Optionally, the method further includes, prior to transmitting the second resume identity to the second base station based on the first resume identity: receiving a second downlink message transmitted from the first base station or the second base station. The second downlink message carries information indicating a format of the second resume identity.

Optionally, the second downlink message includes information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the method further includes: obtaining, based on the two of the seventh predetermined length, the eighth predetermined length and the ninth predetermined length included in the uplink message, the other one of the seventh predetermined length, the eighth predetermined length and the ninth predetermined length.

Optionally, the step of transmitting the second resume identity to the second base station based on the first resume identity includes: extracting, from the base station information having the second predetermined length in the first resume identity, information having the eighth predetermined information according to a third predetermined rule as the base station information in the second resume identity; extracting, from the terminal information having the third predetermined length in the first resume identity, information having the ninth predetermined information according to a fourth predetermined rule as the terminal information in the second resume identity; and transmitting the second resume identity to the second base station.

Optionally, the second downlink message includes one of: system information, a Message 2 for allocating to the terminal resources required for transmission of the connection resumption request message, and a Message 4 for allocating to the terminal resources required for transmission of the connection resumption request message.

Optionally, the information indicating the format of the second resume identity includes one of:

first indication information instructing:

when having a first predetermined value, one of: extracting Most Significant Bits (MSBs) of a tenth predetermined length from the first resume identity as the second resume identity; and extracting MSBs of the tenth predetermined length from the first resume identity to fill in the second resume identity, when having a second predetermined value, one of: extracting Least Significant Bits (LSBs) of an eleventh predetermined length from the first resume identity as the second resume identity; and extracting LSBs of the eleventh predetermined length from the first resume identity to fill in the second resume identity, and second indication information indicating that the second resume identity has a first format when the second indication information has the first predetermined value, or that the second resume identity has a second format, or does not have the first format, when the second indication information has the second predetermined value. The first format and the second format are predefined formats.

Optionally, the information indicating the format of the second resume identity includes:

third indication information instructing:

when having a first predetermined value, one of: extracting Most Significant Bits (MSBs) of a tenth predetermined length from the first resume identity as the second resume identity; and extracting MSBs of the tenth predetermined length from the first resume identity to fill in the second resume identity, when having a second predetermined value, one of: extracting Least Significant Bits (LSBs) of an eleventh predetermined length from the first resume identity as the second resume identity; and extracting LSBs of the eleventh predetermined length from the first resume identity to fill in the second resume identity, when having a third predetermined value, one of: extracting middle bits of a twelfth predetermined length from the first resume identity as the second resume identity; and extracting middle bits of the twelfth predetermined length from the first resume identity to fill in the second resume identity, and fourth indication information indicating that the second resume identity has a first format when the fourth indication information has the first predetermined value, that the second resume identity has a second format when the fourth indication information has the second predetermined value, or that the second resume identity has a third format when the fourth indication information has the third predetermined value. The first format, the second format and the third format are predefined formats.

Optionally, the second downlink message includes one of: indication information instructing extracting a portion from the first resume identity as the second resume identity, and indication information instructing extracting a predetermined portion of information from the first resume identity to fill in the second resume identity.

Optionally, the second downlink message includes fifth indication information or sixth indication information. The fifth indication information or sixth indication information instructs: when having a first predetermined value, extracting Most Significant Bits (MSBs) of a tenth predetermined length from the first resume identity as the second resume identity; or extracting MSBs of the tenth predetermined length from the first resume identity to fill in the second resume identity, or when having a second predetermined value: extracting Least Significant Bits (LSBs) of an eleventh predetermined length from the first resume identity as the second resume identity; and extracting LSBs of the eleventh predetermined length from the first resume identity to fill in the second resume identity. Alternatively, the fifth indication information or sixth indication information indicates that the second resume identity has a first format when the fifth indication information or sixth indication information has the first predetermined value, or that the second resume identity has a second format, or does not have the first format, when the fifth indication information or sixth indication information has the second predetermined value. The first format and the second format are predefined formats.

Optionally, the information indicating the format of the fourth resume identity and/or the coding rule for the fourth resume identity includes at least one of: indication information indicating whether the fourth resume identity has a format representing a truncated resume identity, indication information instructing filling the third resume identity in the fourth resume identity, and indication information indicating a predetermined portion of the fourth resume identity to be valid.

Optionally, the information indicating the format of the fourth resume identity and/or the coding rule for the fourth resume identity includes at least one of seventh indication information or eighth indication information. The seventh indication information or eighth indication information indicates that the fourth resume identity has the format representing the truncated resume identity when the seventh indication information or eighth indication information has a first predetermined value, or that the fourth resume identity has a format of a full resume identity or has a format not representing the truncated resume identity when the seventh indication information or eighth indication information has a second predetermined value. Alternatively, the seventh indication information or eighth indication information instructs filling the third resumption indication in Most Significant Bits (MSBs) of a tenth predetermined length in the fourth resumption indication or indicates the MSBs of the tenth predetermined length in the fourth resumption indication to be valid when the seventh indication information or eighth indication information has the first predetermined value, or instructs filling the third resumption indication in Least Significant Bits (LSBs) of an eleventh predetermined length in the fourth resumption indication or indicates the LSBs of the eleventh predetermined length of the fourth resumption indication to be valid when the seventh indication information or eighth indication information has the second predetermined value.

Optionally, the format representing the truncated resume identity is a predefined format. Alternatively, the format representing the truncated resume identity has a first predetermined portion of bits being valid and a second predetermined portion of bits being padding bits. The information representing the truncated resume identity has a length of 40 bits.

Optionally, the tenth, eleventh and twelfth predetermined lengths are the same or different.

Optionally, the tenth, eleventh and twelfth predetermined lengths are predefined or indicated in a predetermined scheme. The predetermined scheme includes using a system message or a downlink message.

Optionally, the first predetermined value is 1 or 0, or the second predetermined value is 0 or 1.

Optionally, each of the first, second, third, fourth, fifth, sixth, seventh and/eighth indication information is 1-bit information which includes Boolean information or enumerative information or multi-bit information which includes enumerative information.

According to another embodiment of the present disclosure, a method for connection handling is provided. The method includes: obtaining indication information transmitted from an Access Stratum (AS) of a terminal, the indication information instructing a Non-Access Stratum (NAS) of the terminal to perform a predetermined operation; and performing the predetermined operation based on the indication information.

Optionally, the step of performing the predetermined operation based on the indication information includes:

obtaining an indication type of the indication information, the indication type including at least one of: a suspension retention indication, a Narrow Band Internet of Things (NB-IoT) terminal type indication, a NAS signaling handling indication, a connection resumption failure indication, a connection suspension indication, a base station supporting Control Plane (CP) optimization indication and a base station supporting User Plane (UP) optimization indication, performing, when the indication type includes the suspension retention indication, the predetermined operation indicated by the suspension retention indication based on the suspension retention indication, the suspension retention indication instructing one of: retaining a suspension flag, clearing the suspension flag, the NAS to be in an idle state with the suspension flag, the NAS to be in an idle state without the suspension flag, entering the idle state with the suspension flag, entering the idle state without the suspension flag, maintaining the idle state with the suspension flag, and leaving the idle state with the suspension flag;

obtaining, when the indication type includes the NB-IoT terminal type indication, a terminal type of the terminal based on the NB-IoT terminal type indication;

sending or refraining from sending, when the indication type includes the NAS signaling handling indication, a buffered NAS signaling to the AS of the terminal based on the NAS signaling handling indication;

sending, when the indication type includes the connection resumption failure indication, the buffered NAS signaling to the AS of the terminal and entering a connected state based on the connection resumption failure indication;

entering, when the indication type includes the connection suspension indication, the idle state with the suspension flag based on the connection suspension indication;

determining, when the indication type includes the base station supporting CP optimization indication, whether to recommend using a CP optimization scheme or not in a NAS signaling for attachment based on the base station supporting CP optimization indication, or whether to use the CP optimization scheme when transmitting data and/or signaling based on the base station supporting CP optimization indication; and determining, when the indication type includes the base station supporting UP optimization indication, whether to recommend using a UP optimization scheme or not in a NAS signaling for attachment based on the base station supporting UP optimization indication, or whether to use the UP optimization scheme when transmitting data and/or signaling based on the base station supporting UP optimization indication.

Optionally, the step of performing the predetermined operation based on the indication information includes: recommending using the CP optimization scheme in the NAS signaling for attachment when the base station supporting CP optimization indication has a seventh predetermined value, or not using the CP optimization scheme in the NAS signaling for attachment when the base station supporting CP optimization indication has an eighth predetermined value; and recommending using the UP optimization scheme in the NAS signaling for attachment when the base station supporting UP optimization indication has a ninth predetermined value, or not using the UP optimization scheme in the NAS signaling for attachment when the base station supporting UP optimization indication has a tenth predetermined value.

Optionally, the step of performing the predetermined operation based on the indication information includes, when the NAS is currently in the idle state without the suspension flag: sending a NAS signaling 1 or 3 to the AS and requesting the AS to establish a connection initially when the base station supporting CP optimization indication has a seventh predetermined value, or sending a NAS signaling 2 or 3 to the AS and requesting the AS to establish a connection initially when the base station supporting CP optimization indication has an eighth predetermined value.

Optionally, the step of performing the predetermined operation based on the indication information includes, when the NAS is currently in the idle state with the suspension flag: buffering a NAS signaling 2 or 3 to the AS and requesting the AS to establish a connection initially when the base station supporting UP optimization indication has a ninth predetermined value, or sending a NAS signaling 2 or 3 to the AS and requesting the AS to establish a connection initially when the base station supporting UP optimization indication has a tenth predetermined value.

Optionally, the NAS signaling 1 is a NAS signaling for data service request, the NAS signaling 2 is a NAS signaling for service request, and the NAS signaling 3 is a NAS signaling for tracking area update.

Optionally, the step of performing the predetermined operation based on the indication information includes:

performing the predetermined operation indicated by the suspension retention indication when the suspension retention indication has a first predetermined value, the predetermined operation including one of: retaining the suspension flag, the NAS to be in an idle state with the suspension flag, entering the idle state with the suspension flag, and maintaining the idle state with the suspension flag;

clearing the suspension flag, the NAS to be in an idle state without the suspension flag, entering the idle state without the suspension flag, and leaving the idle state with the suspension flag when the suspension retention indication has a second predetermined value, obtaining the terminal type of the terminal as an NB-IoT terminal when the NB-IoT terminal type indication has a third predetermined value;

obtaining the terminal type of the terminal as a non-NB-IoT terminal when the NB-IoT terminal type indication has a fourth predetermined value;

sending the buffered NAS signaling to the AS of the terminal when the NAS signaling handling indication has a fifth predetermined value; and refraining from sending the buffered NAS signaling to the AS of the terminal when the NAS signaling handling indication has a sixth predetermined value.

According to another embodiment of the present disclosure, a method for connection handling is provided. The method includes: transmitting a first downlink message and/or a first resume identity to a terminal. The first resume identity is to be used by the terminal for transmitting an uplink message and/or a second resume identity based on the first resume identity.

Optionally, the method further includes, after transmitting the first downlink message and/or the first resume identity to the terminal: receiving the uplink message and/or the second resume identity transmitted from the terminal based on the first resume identity.

Optionally, the first downlink message carries information indicating a format of the first resume identity transmitted to the terminal.

Optionally, the information indicating the format of the first resume identity includes: information indicating a meaning of information carried in the first resume identity and information indicating a length of the information carried in the first resume identity.

Optionally, the first downlink message includes information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the method further includes: obtaining, based on the two of the first predetermined length, the second predetermined length and the third predetermined length included in the first downlink message, the other one of the first predetermined length, the second predetermined length and the third predetermined length.

Optionally, the uplink message carries information indicating a format of the second resume identity transmitted from the terminal.

Optionally, the method further includes, prior to receiving the uplink message and/or the second resume identity transmitted from the terminal based on the first resume identity: transmitting to the terminal a second downlink message carrying information indicating a format of the second resume identity.

Optionally, the second downlink message includes information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the method further includes: obtaining, based on the two of the seventh predetermined length, the eighth predetermined length and the ninth predetermined length included in the uplink message, the other one of the seventh predetermined length, the eighth predetermined length and the ninth predetermined length.

Optionally, the second downlink message includes one of: system information, a Message 2 for allocating to the terminal resources required for transmission of the connection resumption request message, and a Message 4 for allocating to the terminal resources required for transmission of the connection resumption request message.

According to another embodiment of the present disclosure, an apparatus for connection handling is provided. The apparatus includes: a first receiving module configured to receive a connection request that requests for establishing or resuming a connection with a base station; and an instructing module configured to instruct a Non-Access Stratum (NAS) of a terminal to perform a predetermined operation based on an obtained first connection result corresponding to the connection request.

According to another embodiment of the present disclosure, an apparatus for connection handling is provided. The apparatus includes: a second receiving module configured to receive a first downlink message and/or a first resume identity transmitted from a first base station; and a first transmitting module configured to transmit an uplink message and/or a second resume identity to a second base station based on the first resume identity.

Optionally, the apparatus further includes: a third receiving module configured to receive a second downlink message transmitted from the first base station or the second base station. The second downlink message carries information indicating a format of the second resume identity.

According to another embodiment of the present disclosure, an apparatus for connection handling is provided. The apparatus includes: an obtaining module configured to obtain indication information transmitted from an Access Stratum (AS) of a terminal, the indication information instructing a Non-Access Stratum (NAS) of the terminal to perform a predetermined operation; and a performing module configured to perform the predetermined operation based on the indication information.

According to another embodiment of the present disclosure, an apparatus for connection handling is provided. The apparatus includes: a second transmitting module configured to transmit a first downlink message and/or a first resume identity to a terminal. The first resume identity is to be used by the terminal for transmitting an uplink message and/or a second resume identity based on the first resume identity.

Optionally, the apparatus further includes: a fourth receiving module configured to receive the uplink message and/or the second resume identity transmitted from the terminal based on the first resume identity.

Optionally, the apparatus further includes: a third transmitting module configured to transmit to the terminal a second downlink message carrying information indicating a format of the second resume identity.

According to another embodiment of the present disclosure, a method for connection handling is provided. The method includes: receiving, by a first network element, a third resume identity and/or a first message carrying the third resume identity; and constructing, by the first network element, a fourth resume identity and/or a second message carrying the fourth resume identity based on the third resume identity, and transferring the fourth resume identity and/or the second message to one or more second network elements. The fourth resume identity requests the one or more second network elements to transfer context information of a terminal to the first network element based on the fourth resume identity.

Optionally, the second message carries information indicating a format of the fourth resume identity and/or a coding rule for the fourth resume identity.

Optionally, the fourth resume identity carries information indicating a format of the fourth resume identity and/or a coding rule for the fourth resume identity.

Optionally, the information indicating the format of the fourth resume identity and/or the coding rule for the fourth resume identity includes at least one of: information indicating a meaning of information carried in the fourth resume identity, and information indicating a length of the information carried in the fourth resume identity.

Optionally, the format of the fourth resume identity and/or the coding rule for the fourth resume identity includes at least one of:

a total length of the fourth resume identity, a length of effective bits in the fourth resume identity, a starting position of effective bits carried in the fourth resume identity, or an offset between the starting position of the effective bits and a first predetermined position, whether the fourth resume identity carries base station information, whether the fourth resume identity carries terminal information, a length of the base station information carried in the fourth resume identity, a length of the terminal information carried in the fourth resume identity, a starting position of the base station information in the fourth resume identity or an offset between the starting position of the base station information and a second predetermined position, a starting position of the terminal information in the fourth resume identity or an offset between the starting position of the terminal information and a third predetermined position, a total length of the base station information and the terminal information carried in the fourth resume identity, a starting position of the base station information and the terminal information in the fourth resume identity or an offset between the starting position of the base station information and the terminal information and a fourth predetermined position, whether the fourth resume identity carries predetermined information, a meaning of the predetermined information carried in the fourth resume identity, a length of the predetermined information carried in the fourth resume identity, a starting position of the predetermined information carried in the fourth resume identity or an offset between the starting position of the predetermined information and a fifth predetermined position, a total length of the base station information, the terminal information and the predetermined information in the fourth resume identity, a starting position of the base station information, the terminal information and the predetermined information in the fourth resume identity, or an offset between the starting position of the base station information, the terminal information and the predetermined information and a sixth predetermined position.

Optionally, the first network element includes one of: a first Mobility Management Entity (MME), a first base station, a first cell, a target MME, a target base station, a target cell, an MME to which the terminal initiates a connection resumption, a base station to which the terminal initiates a connection resumption, and a cell to which the terminal initiates a connection resumption. The second network element includes one of: a second MME, a second base station, a second cell, a source MME, a source base station, a source cell, an MME storing context information of the terminal, a base station storing context information of the terminal, and a cell storing context information of the terminal.

Optionally, the first message includes an air interface connection resumption request message, "RRCConnectionResumeRequest Message". The second message includes one of: an X2 interface retrieving terminal context information request message, "X2 RETRIEVE UE CONTEXT REQUEST", and an S1 interface retrieving terminal context information request message.

According to another embodiment of the present disclosure, an apparatus for connection handling is provided. The apparatus is applied in a first network element and includes: a fifth receiving module configured to receive a third resume identity and/or a first message carrying the third resume identity; and a processing module configured to construct a fourth resume identity and/or a second message carrying the fourth resume identity based on the third resume identity, and transfer the fourth resume identity and/or the second message to one or more second network elements. The fourth resume identity requests the one or more second network elements to transfer context information of a terminal to the first network element based on the fourth resume identity.

According to another embodiment of the present disclosure, a storage medium is provided. The storage medium stores a program, which, when executed, performs any of the above methods.

According to another embodiment of the present disclosure, a processor is provided.

The processor executes a program to perform any of the above methods.

According to the present disclosure, a connection request is received. The connection request requests for establishing or resuming a connection with a base station. Based on an obtained first connection result corresponding to the connection request, a NAS of a terminal is instructed to perform a predetermined operation. It can be seen that, with the above solution, it is possible to instruct the NAS of the terminal to perform a predetermined operation based on the first connection result of the connection request. In this way, the consistency in operations between the AS and NAS of the terminal can be achieved and the problems associated with inconsistent operations in the user plane optimization in the related art can be solved.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures:

FIG. 12 is a fourth flowchart illustrating a method for connection handling according to an embodiment of the present disclosure;

FIG. 13 is a first block diagram showing a structure of an apparatus for connection handling according to an embodiment of the present disclosure;

FIG. 14 is a second block diagram showing a structure of an apparatus for connection handling according to an embodiment of the present disclosure;

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Embodiment 1

Figure 1:
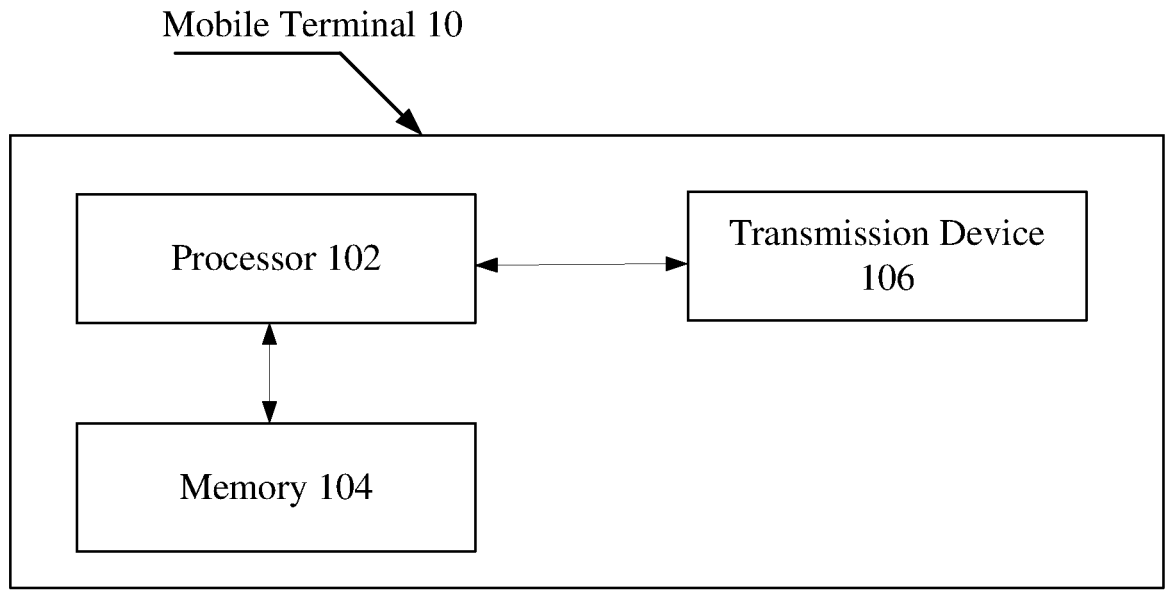
FIG. 1 is a block diagram showing a hardware structure of a mobile terminal in which a method for connection handling can be applied according to an embodiment of the present disclosure.

The method provided according to Embodiment 1 of the present disclosure can be performed in a mobile terminal, a computer terminal or a similar computing device. When the method is performed in a mobile terminal for example, FIG. 1 is a block diagram showing a hardware structure of a mobile terminal in which a method for connection handling can be applied according to an embodiment of the present disclosure. As shown in FIG. 1, the mobile terminal 10 can include: one or more processors 102, a memory 104 for storing data, and a transmission device 106 for providing communication functions. FIG. 1 shows only one processor 102 as an example, which includes, but is not limited to, a processing device like a microprocessor such as MCU or a programmable logic device such as a field-programmable gate array (FPGA) device. It can be appreciated by those skilled in the art that the structure shown in FIG. 1 is illustrative only, and the structure of the above electronic device is not limited thereto. For example, the mobile terminal 10 can include more or less components than those shown in FIG. 1, or have a different configuration from that shown in FIG. 1.

The memory 104 can store software programs and modules of software applications, e.g., program instructions/modules associated with the method for carrier phase recovery according to an embodiment of the present disclosure. The processor 102 performs various functional applications and data processing operations, i.e., performing the above method, by executing the software programs and modules stored in the memory 104. The memory 104 can include a random cache or non-volatile memory such as one or more magnetic storage devices, flash memories or other non-volatile solid-state memories. In some examples, the memory 104 can further include one or more memories which are remote from the processor 102 and can be connected to the mobile terminal 10 via a network. Examples of such network include, but not limited to, Internet, an intranet of an enterprise, a Local Area Network (LAN), a mobile communication network, and any combination thereof.

The transmission device 106 can transmit or receive data via a network. The network can be e.g., a wireless network provided by a communication provider of the mobile terminal 10. In an example, the transmission device 106 includes a network adaptor, or Network Interface Controller (NIC), which can be connected to other network devices via a base station for communication with Internet. In an example, the transmission device 106 can be a Radio Frequency (RF) module for communicating with Internet wirelessly.

Figure 2:
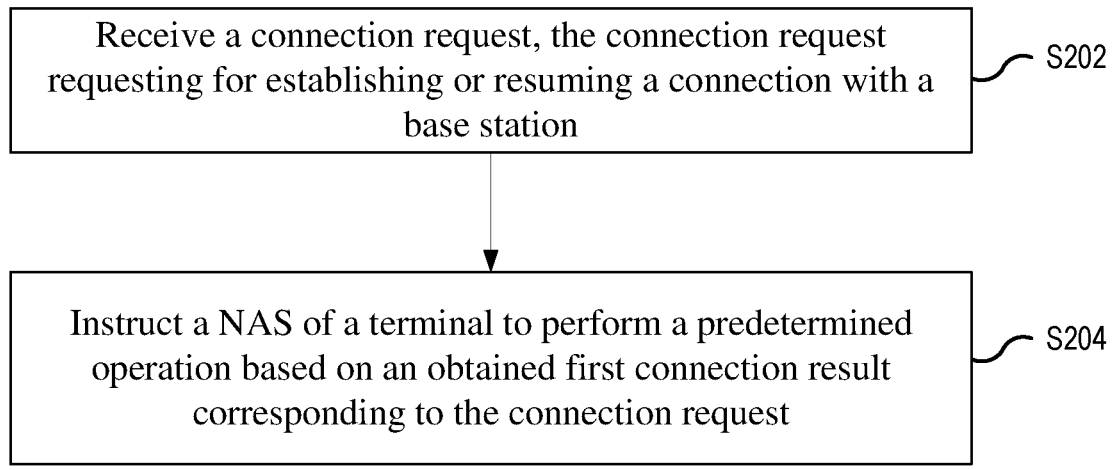
FIG. 2 is a first flowchart illustrating a method for connection handling according to an embodiment of the present disclosure.

In this embodiment, a method for connection handling is provided. FIG. 2 is a first flowchart illustrating a method for connection handling according to an embodiment of the present disclosure. As shown in FIG. 2, the process flow includes the following steps.

At step S202, a connection request is received. The connection request requests for establishing or resuming a connection with a base station.

At step S204, a Non-Access Stratum (NAS) of a terminal is instructed to perform a predetermined operation based on an obtained first connection result corresponding to the connection request.

Optionally, the above method for connection handling can, but not limited to, be applied in a UP optimization scenario, e.g., a UP optimization in MTC.

Optionally, the above method for connection handling can, but not limited to, be applied in a terminal, such as a mobile phone, a tablet computer, a laptop computer, an intelligent wearable device, or the like. Optionally, the above method for connection handling can, but not limited to, be applied in the AS of the terminal.

With the above steps, a connection request is received. The connection request requests for establishing or resuming a connection with a base station. Based on an obtained first connection result corresponding to the connection request, a NAS of a terminal is instructed to perform a predetermined operation. It can be seen that, with the above solution, it is possible to instruct the NAS of the terminal to perform a predetermined operation based on the first connection result of the connection request. In this way, the consistency in operations between the AS and NAS of the terminal can be achieved and the problems associated with inconsistent operations in the user plane optimization in the related art can be solved.

Optionally, the step of instructing the NAS of the terminal to perform the predetermined operation based on the obtained first connection result includes one of the following schemes.

Scheme 1: Transmit to the NAS of the terminal one or more first indication messages carrying indication information.

Scheme 2: Transmit to the NAS of the terminal the one or more first indication messages carrying the indication information and a second indication message indicating a second connection result Scheme 3: Transmit to the NAS of the terminal a third indication message indicating the second connection result and carrying the indication information.

Here, in the above three schemes, the indication information instructs the NAS of the terminal to perform the predetermined operation.

Optionally, the indication information can include, but not limited to, at least one of the following.

Indication 1: a suspension retention indication for instructing one of: the NAS to retain a suspension flag, the NAS to clear the suspension flag, the NAS to be in an idle state with the suspension flag, the NAS to be in an idle state without the suspension flag, the NAS to enter the idle state with the suspension flag, the NAS to enter the idle state without the suspension flag, the NAS to maintain the idle state with the suspension flag, and the NAS to leave the idle state with the suspension flag.

Indication 2: a Narrow Band Internet of Things (NB-IoT) terminal type indication for indicating to the NAS that the terminal is or is not an NB-IoT terminal.

Indication 3: a NAS signaling handling indication for instructing the NAS to or not to send a buffered NAS signaling to an Access Stratum (AS) of the terminal.

Indication 4: a connection resumption failure indication for instructing the NAS to send the buffered NAS signaling to the AS of the terminal and to enter a connected state.

Indication 5: a connection suspension indication for instructing the NAS to enter the idle state with the suspension flag. In an example of the present disclosure, upon receiving a reestablishment rejection message with a suspension flag, the AS of the terminal can sends the connection suspension indication to the NAS of the terminal, instructing the NAS of the terminal to enter the idle state with the suspension flag.

Indication 6: a base station supporting Control Plane (CP) optimization indication indicating whether a base station supports a CP optimization scheme or not. Here, whether the base station supports the CP optimization scheme or not can be determined based on whether the CP optimization scheme is recommended in NAS signaling for attachment and/or tracking area update or whether the CP optimization scheme is adopted for transmission of data and/or signaling.

Indication 7: a base station supporting User Plane (UP) optimization indication indicating whether a base station supports a UP optimization scheme or not. Here, whether the base station supports the UP optimization scheme or not can be determined based on whether the UP optimization scheme is recommended in NAS signaling for attachment and/or tracking area update or whether the UP optimization scheme is adopted for transmission of data and/or signaling.

Optionally, when the suspension retention indication has a first predetermined value, the suspension retention indication can, as a non-limiting example, instruct one of: the NAS to retain the suspension flag, the NAS to be in an idle state with the suspension flag, the NAS to enter the idle state with the suspension flag, and the NAS to maintain the idle state with the suspension flag. When the suspension retention indication has a second predetermined value, the suspension retention indication instructs one of: the NAS to clear the suspension flag, the NAS to be in an idle state without the suspension flag, the NAS to enter the idle state without the suspension flag, and the NAS to leave the idle state with the suspension flag.

Optionally, the suspension retention indication can, but not limited to, be a 1-bit value. For example, the first predetermined value can, but not limited to, be 1 or "failure to resume with suspend", and the second predetermined value can, but not limited to, be 0 or "failure to resume without suspend".

Optionally, the first connection result can, as a non-limiting example, include one of: the AS of the terminal being unable to transmit a connection resumption request message for failing to pass an Access Barring test, the AS of the terminal receiving a connection rejection message carrying suspension information, the AS of the terminal receiving a connection rejection message carrying no suspension information, the AS of the terminal receiving a reestablishment rejection message carrying suspension information, timeout of a timer started after the AS of the terminal has transmitted a Message 3, "Msg3", the AS of the terminal being unable to transmit a connection resumption request message as a current serving base station does not support the UP optimization scheme, and the AS of the terminal being unable to transmit a connection resumption request message as there is no AS context information stored.

Optionally, the NB-IoT terminal type indication can, as a non-limiting example, indicate to the NAS that the terminal is an NB-IoT terminal when the NB-IoT terminal type indication has a third predetermined value, and the NB-IoT terminal type indication can, as a non-limiting example, indicate to the NAS that the terminal is not an NB-IoT terminal when the NB-IoT terminal type indication has a fourth predetermined value.

Optionally, the NB-IoT terminal type indication can, but not limited to, be a 1-bit value. The third predetermined value can, but not limited to, be 1 and the fourth predetermined value can, but not limited to, be 0.

Optionally, the first connection result can, as a non-limiting example, include: the AS of the terminal transferring an extended wait timer to the NAS after receiving a connection rejection message.

Optionally, the NAS signaling handling indication can, as a non-limiting example, instruct the NAS to send the buffered NAS signaling to the AS of the terminal when the NAS signaling handling indication has a fifth predetermined value, and/or the NAS signaling handling indication can, as a non-limiting example, instruct the NAS to enter the connected. The NAS signaling handling indication can, as a non-limiting example, instruct the NAS not to send the buffered NAS signaling to the AS of the terminal when the NAS signaling handling indication has a sixth predetermined value.

Optionally, the NAS signaling handling indication can, but not limited to, be a 1-bit value. The fifth predetermined value can, but not limited to, be 1 and the sixth predetermined value can, but not limited to, be 0.

Optionally, the first connection result can, as a non-limiting example, include one of: the AS of the terminal being unable to transmit a connection resumption request message as a current serving base station does not support the UP optimization scheme, and the AS of the terminal being unable to transmit a connection resumption request message as there is no AS context information stored.

Optionally, after the above step S202: the connection request can be recorded as a connection establishment request or a connection resumption request, depending on a request type of the connection request.

Optionally, the second connection result can, as a non-limiting example, include one of: a connection resumption failure, "failure to resume the RRC connection", and a connection establishment failure, "failure to establish the RRC connection".

In the following, the process for connection handling will be described and explained with reference to some optional examples.

In an optional example, the AS of the terminal receives a connection resumption request indication from the NAS of the terminal, but finds out that the base station does not support the UP optimization scheme or no AS context information is stored. In this case, the AS of the terminal can mark that the NAS has requested for resumption, clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, based on the mark that the NAS has requested for resumption, the AS of the terminal can sends a connection resumption failure indication, "RRC connection resume has filed", to the NAS of the terminal.

In another optional example, the AS of the terminal receives a connection resumption request indication from the NAS of the terminal, but finds out that the base station does not support the UP optimization scheme or no AS context information is stored. In this case, the AS of the terminal can mark that the NAS has requested for resumption, clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, based on the mark that the NAS has requested for resumption, the AS of the terminal can send a NAS signaling handling indication to the NAS of the terminal for instructing the NAS to send a buffered NAS signaling to the AS of the terminal.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, if the AS of the terminal does not have any NAS signaling to transmit before transmitting an "RRCConnectionSetupComplete" message, the AS of the terminal can send a NAS signaling handling indication to the NAS of the terminal for instructing the NAS to send a buffered NAS signaling to the AS of the terminal.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and send a resumption failure indication and/or a suspension retention indication having the second predetermined value to the NAS, for instructing the NAS to enter the idle state without the suspension flag. Implicitly, the NAS of the terminal can clear the buffered NAS signaling and initiate the connection establishment request again either immediately or after a period of time.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and send a "failure to resume without suspend" indication to the NAS, for instructing the NAS to enter the idle state without the suspension flag. Implicitly, the NAS of the terminal can clear the buffered NAS signaling and initiate the connection establishment request again either immediately or after a period of time.

Optionally, the second indication message or the third indication message can, as a non-limiting example, include a resumption failure indication, "failure to resume".

Optionally, the third indication message can, as a non-limiting example, include one of: "failure to resume with suspend" and "failure to resume without suspend".

In an example, a method for connection handling is provided. An AS of a terminal receives a connection rejection message. If the connection rejection message contains suspension information, the AS of the terminal can send a "failure to resume with suspend" indication to a NAS of the terminal for instructing the NAS of the terminal to maintain an idle state with a suspension flag. If the connection rejection message contains no suspension information, the AS of the terminal can send a "failure to resume without suspend" indication to the NAS of the terminal for instructing the NAS of the terminal to clear the suspension flag and enter an idle state without a suspension flag.

In another example, a method for connection handling is provided. An AS of a terminal cannot transmit a resumption request message due to failure in an access test. The AS of the terminal can send a "failure to resume with suspend" indication to a NAS of the terminal for instructing the NAS of the terminal to maintain an idle state with a suspension flag. According to another embodiment of the present disclosure, a method for connection handling is provided. In response to timeout of a timer set after transmission of Message 3 (connection resumption request message), an AS of a terminal can send a "failure to resume with suspend" indication to a NAS of the terminal for instructing the NAS of the terminal to maintain an idle state with a suspension flag.

Embodiment 2

Figure 3:
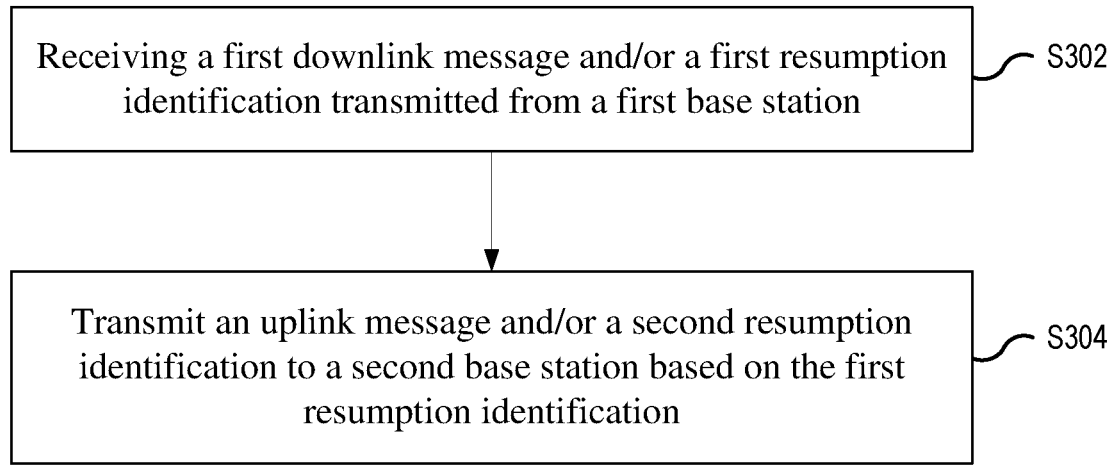
FIG. 3 is a second flowchart illustrating a method for connection handling according to an embodiment of the present disclosure.

In this embodiment, a method for connection handling is provided. FIG. 3 is a second flowchart illustrating a method for connection handling according to an embodiment of the present disclosure. As shown in FIG. 3, the process flow includes the following steps.

At step S302, a first downlink message and/or a first resume identity transmitted from a first base station is received.

At step S304, an uplink message and/or a second resume identity is transmitted to a second base station based on the first resume identity.

Optionally, the above method for connection handling can, but not limited to, be applied in a UP optimization scenario, e.g., a UP optimization in MTC.

Optionally, the above method for connection handling can, but not limited to, be applied in a terminal, such as a mobile phone, a tablet computer, a laptop computer, an intelligent wearable device, or the like. Optionally, the above method for connection handling can, but not limited to, be applied in the NAS of the terminal.

With the above steps, a first downlink message and/or a first resume identity transmitted from a base station is received. An uplink message and/or a second resume identity is transmitted to a base station based on the first resume identity. It can be seen that, with the above solution, it is possible to transmit an uplink message and/or a second resume identity to a base station based on a first resume identity transmitted from the base station. In this way, the consistency in operations between the terminal and the base station can be achieved and the problems associated with inconsistent operations in the user plane optimization in the related art can be solved.

In this embodiment, the first base station and the second base station can be the same base station or different base stations.

Optionally, the first downlink message can, as a non-limiting example, carry information indicating a format of the first resume identity transmitted from the first base station.

Optionally, the information indicating the format of the first resume identity can, as a non-limiting example, include: information indicating a meaning of information carried in the first resume identity and information indicating a length of the information carried in the first resume identity.

Optionally, the first downlink message can, as a non-limiting example, include information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the method can, as a non-limiting example, further include: obtaining, based on the two of the first predetermined length, the second predetermined length and the third predetermined length included in the first downlink message, the other one of the first predetermined length, the second predetermined length and the third predetermined length.

Optionally, the uplink message can, as a non-limiting example, carry information indicating a format of the second resume identity transmitted to the second base station.

Optionally, the information indicating the format of the second resume identity can, as a non-limiting example, include: information indicating a meaning of information carried in the second resume identity and information indicating a length of the information carried in the second resume identity.

Optionally, the uplink message can, as a non-limiting example, include information indicating at least two of: a total length of the second resume identity being a fourth predetermined length, a length of base station information carried in the second resume identity being a fifth predetermined length, and a length of terminal information carried in the second resume identity being a sixth predetermined length.

Optionally, the uplink message includes two of the fourth predetermined length, the fifth predetermined length and the sixth predetermined length, and the method can, as a non-limiting example, further include: obtaining, based on the two of the fourth predetermined length, the fifth predetermined length and the sixth predetermined length included in the uplink message, the other one of the fourth predetermined length, the fifth predetermined length and the sixth predetermined length.

Optionally, in the above step S304, the second resume identity can, as a non-limiting example, be constructed and transmitted by: extracting, from the base station information having the second predetermined length in the first resume identity, information having the fifth predetermined information according to a first predetermined rule as the base station information in the second resume identity; extracting, from the terminal information having the third predetermined length in the first resume identity, information having the sixth predetermined information according to a second predetermined rule as the terminal information in the second resume identity; and transmitting the second resume identity to the second base station.

Optionally, the format of the second resume identity can be indicated by the first base station or the second base station. For example, before the above step S304, a second downlink message transmitted from the first base station or the second base station can be received. The second downlink message can carry information indicating a format of the second resume identity.

Optionally, the second downlink message can, as a non-limiting example, include information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the method can, as a non-limiting example, further include: obtaining, based on the two of the seventh predetermined length, the eighth predetermined length and the ninth predetermined length included in the uplink message, the other one of the seventh predetermined length, the eighth predetermined length and the ninth predetermined length.

Optionally, the second resume identity can, as a non-limiting example, be constructed and transmitted to the second base station by: extracting, from the base station information having the second predetermined length in the first resume identity, information having the eighth predetermined information according to a third predetermined rule as the base station information in the second resume identity; extracting, from the terminal information having the third predetermined length in the first resume identity, information having the ninth predetermined information according to a fourth predetermined rule as the terminal information in the second resume identity; and transmitting the second resume identity to the second base station.

Optionally, the second downlink message can, as a non-limiting example, include one of: system information, a Message 2 for allocating to the terminal resources required for transmission of the connection resumption request message, and a Message 4 for allocating to the terminal resources required for transmission of the connection resumption request message.

Optionally, the information indicating the format of the second resume identity can, as a non-limiting example, include one of first indication information and second indication information. The first indication information instructs, when having a first predetermined value, one of: extracting Most Significant Bits (MSBs) of a tenth predetermined length from the first resume identity as the second resume identity; and extracting MSBs of the tenth predetermined length from the first resume identity to fill in the second resume identity, or instructs, when having a second predetermined value, one of: extracting Least Significant Bits (LSBs) of an eleventh predetermined length from the first resume identity as the second resume identity; and extracting LSBs of the eleventh predetermined length from the first resume identity to fill in the second resume identity. The second indication information indicates that the second resume identity has a first format when the second indication information has the first predetermined value, or that the second resume identity has a second format, or does not have the first format, when the second indication information has the second predetermined value. The first format and the second format are predefined formats.

For example, the information indicating the format of the second resume identity can include 1-bit indication information. The indication information instructs, when having a first predetermined value, extracting MSBs of a tenth predetermined length from the first resume identity as the second resume identity, or extracting MSBs of the tenth predetermined length from the first resume identity to fill in the second resume identity, or instructs, when having a second predetermined value, extracting LSBs of an eleventh predetermined length from the first resume identity as the second resume identity, or extracting LSBs of the eleventh predetermined length from the first resume identity to fill in the second resume identity. Alternatively, the information can be 1-bit indication information, which indicates that the second resume identity has a first format when it has the first predetermined value, or that the second resume identity has a second format, or does not have the first format, when it has the second predetermined value. The first format and the second format are predefined formats.

Optionally, the information indicating the format of the second resume identity can include third indication information or fourth indication information. The third indication information instructs, when having a first predetermined value: extracting Most Significant Bits (MSBs) of a tenth predetermined length from the first resume identity as the second resume identity; or extracting MSBs of the tenth predetermined length from the first resume identity to fill in the second resume identity. The third indication information instructs, when having a second predetermined value: extracting Least Significant Bits (LSBs) of an eleventh predetermined length from the first resume identity as the second resume identity; or extracting LSBs of the eleventh predetermined length from the first resume identity to fill in the second resume identity. The third indication information instructs, when having a third predetermined value: extracting middle bits of a twelfth predetermined length from the first resume identity as the second resume identity; and extracting middle bits of the twelfth predetermined length from the first resume identity to fill in the second resume identity. The fourth indication information indicates that the second resume identity has a first format when the fourth indication information has the first predetermined value, that the second resume identity has a second format when the fourth indication information has the second predetermined value, or that the second resume identity has a third format when the fourth indication information has the third predetermined value. The first format, the second format and the third format are predefined formats.

For example, the information indicating the format of the second resume identity can include 2-bit indication information. The indication information instructs, when having a first predetermined value: extracting MSBs of a tenth predetermined length from the first resume identity as the second resume identity; or extracting MSBs of the tenth predetermined length from the first resume identity to fill in the second resume identity. The indication information instructs, when having a second predetermined value: extracting LSBs of an eleventh predetermined length from the first resume identity as the second resume identity; or extracting LSBs of the eleventh predetermined length from the first resume identity to fill in the second resume identity. The indication information instructs, when having a third predetermined value: extracting middle bits of a twelfth predetermined length from the first resume identity as the second resume identity; and extracting middle bits of the twelfth predetermined length from the first resume identity to fill in the second resume identity. Alternatively, the information can be 2-bit indication information, which indicates that the second resume identity has a first format when it has the first predetermined value, that the second resume identity has a second format when it has the second predetermined value, or that the second resume identity has a third format when it has the third predetermined value. The first format, the second format and the third format are predefined formats.

Optionally, the second downlink message can include one of: indication information instructing extracting a portion from the first resume identity as the second resume identity, and indication information instructing extracting a predetermined portion of information from the first resume identity to fill in the second resume identity.

For example, the second downlink message can include indication information which instructs extracting a portion from the first resume identity as the second resume identity, or extracting a portion from the first resume identity to fill in the second resume identity Optionally, the second downlink message can include fifth indication information or sixth indication information. The fifth indication information or sixth indication information instructs: when having a first predetermined value, extracting Most Significant Bits (MSBs) of a tenth predetermined length from the first resume identity as the second resume identity; or extracting MSBs of the tenth predetermined length from the first resume identity to fill in the second resume identity, or when having a second predetermined value: extracting Least Significant Bits (LSBs) of an eleventh predetermined length from the first resume identity as the second resume identity; and extracting LSBs of the eleventh predetermined length from the first resume identity to fill in the second resume identity. Alternatively, the fifth indication information or sixth indication information indicates that the second resume identity has a first format when the fifth indication information or sixth indication information has the first predetermined value, or that the second resume identity has a second format, or does not have the first format, when the fifth indication information or sixth indication information has the second predetermined value. The first format and the second format are predefined formats.

For example, the second downlink message can include 1-bit or 2-bit indication information. The indication information instructs: when having a first predetermined value, extracting MSBs of a tenth predetermined length from the first resume identity as the second resume identity; or extracting MSBs of the tenth predetermined length from the first resume identity to fill in the second resume identity, or when having a second predetermined value: extracting LSBs of an eleventh predetermined length from the first resume identity as the second resume identity; and extracting LSBs of the eleventh predetermined length from the first resume identity to fill in the second resume identity. Alternatively, the indication information can be 1-bit or 2-bit indication information, which indicates that the second resume identity has a first format when it has the first predetermined value, or that the second resume identity has a second format, or does not have the first format, when it has the second predetermined value. The first format and the second format are predefined formats.

Optionally, the information indicating the format of the fourth resume identity and/or the coding rule for the fourth resume identity can include at least one of: indication information indicating whether the fourth resume identity has a format representing a truncated resume identity, indication information instructing filling the third resume identity in the fourth resume identity, and indication information indicating a predetermined portion of the fourth resume identity to be valid.

For example, the information indicating the format of the fourth resume identity and/or the coding rule for the fourth resume identity can indicate whether the fourth resume identity has a format representing a truncated resume identity, instruct filling the third resume identity in the fourth resume identity, or indicate a portion of the fourth resume identity to be valid.

Optionally, the information indicating the format of the fourth resume identity and/or the coding rule for the fourth resume identity can includes at least one of seventh indication information or eighth indication information. The seventh indication information or eighth indication information indicates that the fourth resume identity has the format representing the truncated resume identity when the seventh indication information or eighth indication information has a first predetermined value, or that the fourth resume identity has a format of a full resume identity or has a format not representing the truncated resume identity when the seventh indication information or eighth indication information has a second predetermined value. Alternatively, the seventh indication information or eighth indication information instructs filling the third resumption indication in Most Significant Bits (MSBs) of a tenth predetermined length in the fourth resumption indication or indicates the MSBs of the tenth predetermined length in the fourth resumption indication to be valid when the seventh indication information or eighth indication information has the first predetermined value, or instructs filling the third resumption indication in Least Significant Bits (LSBs) of an eleventh predetermined length in the fourth resumption indication or indicates the LSBs of the eleventh predetermined length of the fourth resumption indication to be valid when the seventh indication information or eighth indication information has the second predetermined value.

For example, the information indicating the format of the fourth resume identity and/or the coding rule for the fourth resume identity can include 1-bit or 2-bit indication information. The indication information indicates that the fourth resume identity has the format representing the truncated resume identity when it has a first predetermined value, or that the fourth resume identity has a format of a full resume identity or has a format not representing the truncated resume identity when it has a second predetermined value. Alternatively, the information instructs filling the third resumption indication in MSBs of a tenth predetermined length in the fourth resumption indication or indicates the MSBs of the tenth predetermined length in the fourth resumption indication to be valid when it has the first predetermined value, or instructs filling the third resumption indication in LSBs of an eleventh predetermined length in the fourth resumption indication or indicates the LSBs of the eleventh predetermined length of the fourth resumption indication to be valid when it has the second predetermined value.

Optionally, the format representing the truncated resume identity is a predefined format. Alternatively, the format representing the truncated resume identity has a first predetermined portion of bits being valid and a second predetermined portion of bits being padding bits. The information representing the truncated resume identity has a length of 40 bits.

For example, the format representing the truncated resume identity can be a predefined format. Alternatively, only some of the bits in the format are valid, while others are padding bits. The information representing the truncated resume identity can have a length of 40 bits.

Optionally, the tenth, eleventh and twelfth predetermined lengths can be the same or different.

Optionally, the tenth, eleventh and twelfth predetermined lengths can be predefined or indicated in a predetermined scheme. The predetermined scheme includes using a system message or a downlink message.

For example, the tenth, eleventh and/or twelfth predetermined lengths can be predefined or indicated using a system message or another downlink message.

Optionally, the above indication information can be one bit. The first predetermined value can be 1 or 0, or the second predetermined value can be 0 or 1.

The following examples are provided in this embodiment.

Example 1

During the suspension process, a source base station transmits a full resume identity having a length of 40 bits to a terminal, and a target base station instructs, by using a system message, the terminal to report a truncated resume identity having a length of 24 bits. The target base station transmits an indication of one bit to the terminal by using the system message. When the indication has a value of 1 (or 0), the terminal extracts LSBs of 24 bits from the full resume identity as the truncated resume identity, and when the indication has a value of 0 (or 1), the terminal extracts MSBs of 24 bits from the full resume identity as the truncated resume identity.

Example 2

During the suspension process, a source base station transmits a full resume identity having a length of 40 bits to a terminal, and a target base station instructs, by using a system message, the terminal to report a truncated resume identity having a length of 24 bits. The target base station transmits an indication of two bits to the terminal by using the system message. When the indication has a value of 00, the terminal extracts LSBs of 24 bits from the full resume identity as the truncated resume identity. When the indication has a value of 01, the terminal extracts MSBs of 24 bits from the full resume identity as the truncated resume identity. When the indication has a value of 10, the terminal extracts middle 24 bits from the full resume identity as the truncated resume identity.

Example 3

A target base station receives a truncated resume identity of 24 bits transmitted from a terminal to fill in a full resume identity carried in an X2 interface retrieving terminal context information request message, which also carries an indication of one bit. When the indication has a value of 1 (or 0), it indicates that the resume identity is a full resume identity having all 40 bits being valid. When the indication has a value of 0 (or 1), it indicates that the resume identity has a predefined format, and only some of the bits are valid and others are padding bits. The information representing the truncated resume identity can have a length of 40 bits. Moreover, the target base station transmits the message to one or more source base stations.

Example 4

A target base station receives a truncated resume identity of 24 bits transmitted from a terminal to fill in a full resume identity carried in an X2 interface retrieving terminal context information request message, which also carries an indication of one bit. When the indication has a value of 1 (or 0), it instructs filling the truncated resume identity in MSBs of 24 bits in the full resume identity or indicates MSBs of 24 bits in the full resume identity to be valid. When the indication has a value of 0 (or 1), it instructs filling the truncated resume identity in LSBs of 24 bits in the full resume identity or indicates LSBs of 24 bits in the full resume identity to be valid. Moreover, the target base station transmits the message to one or more source base stations.

Example 5

A target base station receives a truncated resume identity of 24 bits transmitted from a terminal to fill in a full resume identity carried in an X2 interface retrieving terminal context information request message, which also carries an indication of two bits. When the indication has a value of 00, it instructs filling the truncated resume identity in MSBs of 24 bits in the full resume identity or indicates MSBs of 24 bits in the full resume identity to be valid. When the indication has a value of 01, it instructs filling the truncated resume identity in LSBs of 24 bits in the full resume identity or indicates LSBs of 24 bits in the full resume identity to be valid. Alternatively, when the indication has a value of 10, it instructs filling the truncated resume identity in middle 24 bits in the full resume identity carried in the interface retrieving terminal context information request message or indicates middle 24 bits in the full resume identity to be valid. Moreover, the target base station transmits the message to one or more source base stations.

Optionally, each of the first, second, third, fourth, fifth, sixth, seventh and/eighth indication information can be 1-bit information which includes Boolean information or enumerative information or multi-bit information which includes enumerative information.

Embodiment 3

Figure 4:
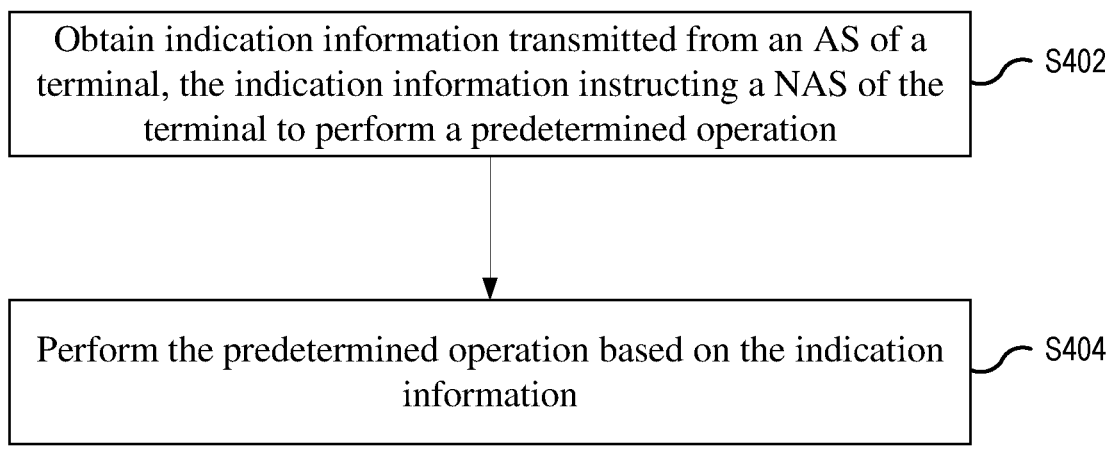
FIG. 4 is a third flowchart illustrating a method for connection handling according to an embodiment of the present disclosure.

In this embodiment, a method for connection handling is provided. FIG. 4 is a third flowchart illustrating a method for connection handling according to an embodiment of the present disclosure. As shown in FIG. 4, the process flow includes the following steps.

At step S402, indication information transmitted from an Access Stratum (AS) of a terminal is obtained. The indication information instructs a Non-Access Stratum (NAS) of the terminal to perform a predetermined operation.

At step S404, the predetermined operation is performed based on the indication information.

Optionally, the above method for connection handling can, but not limited to, be applied in a UP optimization scenario, e.g., a UP optimization in MTC.

Optionally, the above method for connection handling can, but not limited to, be applied in a terminal, such as a mobile phone, a tablet computer, a laptop computer, an intelligent wearable device, or the like. Optionally, the above method for connection handling can, but not limited to, be applied in the NAS of the terminal.

With the above steps, indication information transmitted from an AS of a terminal is obtained. The indication information instructs a NAS of the terminal to perform a predetermined operation. The predetermined operation is performed based on the indication information. It can be seen that, with the above solution, it is possible to perform the predetermined operation based on the indication from the AS of the terminal. In this way, the consistency in operations between the AS and NAS of the terminal can be achieved and the problems associated with inconsistent operations in the user plane optimization in the related art can be solved.

Optionally, in the above step S404, an indication type of the indication information can be obtained. Here, the indication type can include at least one of: a suspension retention indication, a Narrow Band Internet of Things (NB-IoT) terminal type indication, a NAS signaling handling indication, a connection resumption failure indication, a connection suspension indication, a base station supporting Control Plane (CP) optimization indication and a base station supporting User Plane (UP) optimization indication.

When the indication type includes the suspension retention indication, the predetermined operation indicated by the suspension retention indication is performed based on the suspension retention indication. The suspension retention indication instructs one of: retaining a suspension flag, clearing the suspension flag, the NAS to be in an idle state with the suspension flag, the NAS to be in an idle state without the suspension flag, entering the idle state with the suspension flag, entering the idle state without the suspension flag, maintaining the idle state with the suspension flag, and leaving the idle state with the suspension flag.

When the indication type includes the NB-IoT terminal type indication, a terminal type of the terminal is obtained based on the NB-IoT terminal type indication.

When the indication type includes the NAS signaling handling indication, a buffered NAS signaling is, or is not, sent to the AS of the terminal based on the NAS signaling handling indication.

When the indication type includes the connection resumption failure indication, the NAS sends the buffered NAS signaling to the AS of the terminal and enters a connected state based on the connection resumption failure indication.

When the indication type includes the connection suspension indication, the NAS enters the idle state with the suspension flag based on the connection suspension indication.

When the indication type includes the base station supporting CP optimization indication, it is determined whether to recommend using a CP optimization scheme or not in a NAS signaling for attachment based on the base station supporting CP optimization indication, or whether to use the CP optimization scheme when transmitting data and/or signaling based on the base station supporting CP optimization indication.

When the indication type includes the base station supporting UP optimization indication, it is determined whether to recommend using a UP optimization scheme or not in a NAS signaling for attachment based on the base station supporting UP optimization indication, or whether to use the UP optimization scheme when transmitting data and/or signaling based on the base station supporting UP optimization indication.

Optionally, the above step S404 can include at least one of: recommending using the CP optimization scheme in the NAS signaling for attachment when the base station supporting CP optimization indication has a seventh predetermined value, or not using the CP optimization scheme in the NAS signaling for attachment when the base station supporting CP optimization indication has an eighth predetermined value; and recommending using the UP optimization scheme in the NAS signaling for attachment when the base station supporting UP optimization indication has a ninth predetermined value, or not using the UP optimization scheme in the NAS signaling for attachment when the base station supporting UP optimization indication has a tenth predetermined value.

Optionally, in the above step S404, when the NAS is currently in the idle state without the suspension flag: a NAS signaling 1 or 3 is sent to the AS and requesting the AS to establish a connection initially when the base station supporting CP optimization indication has a seventh predetermined value, or a NAS signaling 2 or 3 is sent to the AS and requesting the AS to establish a connection initially when the base station supporting CP optimization indication has an eighth predetermined value.

Optionally, in the above step S404, when the NAS is currently in the idle state with the suspension flag: the NAS buffers a NAS signaling 2 or 3 to the AS and requests the AS to establish a connection initially when the base station supporting UP optimization indication has a ninth predetermined value, or sends a NAS signaling 2 or 3 to the AS and requests the AS to establish a connection initially when the base station supporting UP optimization indication has a tenth predetermined value.

Optionally, the above NAS signaling 1 can, but not limited to, be a NAS signaling for data service request, the NAS signaling 2 can, but not limited to, be a NAS signaling for service request, and the NAS signaling 3 can, but not limited to, be a NAS signaling for tracking area update.

The process of the above connection handling will be explained and described below with reference to optional examples.

Figure 5:
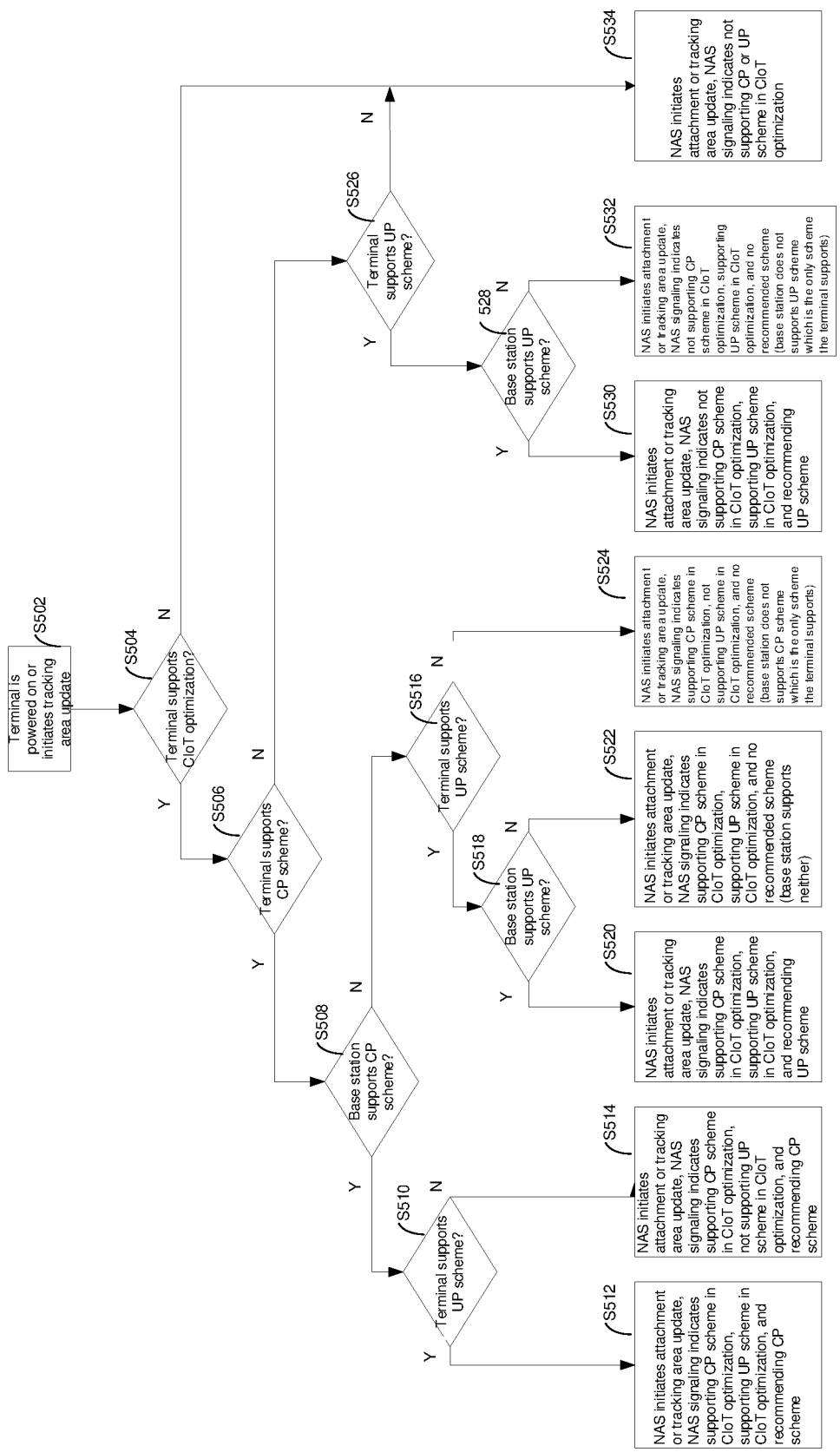
FIG. 5 is a flowchart illustrating a method for NAS decision before transmitting an attach message according to an optional example of the present disclosure.

In an optional example, a method for NAS decision before transmitting an attach message. FIG. 5 is a flowchart illustrating a method for NAS decision before transmitting an attach message according to an optional example of the present disclosure. As shown in FIG. 5, the process comprises the following steps.

At step S502, a terminal is powered on or initiates tracking area update.

At step S504, it is judged whether the terminal supports the CIoT optimization or not. If so, the process proceeds with step S506. Otherwise, the process proceeds with step S534.

At step S506, it is judged whether the terminal supports the CP scheme or not. If so, the process proceeds with step S508. Otherwise, the process proceeds with step S526.

At step S508, it is judged whether a base station supports the CP scheme or not. If so, the process proceeds with step S510. Otherwise, the process proceeds with step S516.

At step S510, it is judged whether the terminal supports the UP scheme or not. If so, the process proceeds with step S512. Otherwise, the process proceeds with step S514.

At step S512, the NAS initiates attachment or tracking area update, and it is indicated in NAS signaling that the CP scheme in the CIoT optimization is supported, the UP scheme in the CIoT optimization is supported, and the CP scheme is recommended.

At step S514, the NAS initiates attachment or tracking area update, and it is indicated in NAS signaling that the CP scheme in the CIoT optimization is supported, the UP scheme in the CIoT optimization is not supported, and the CP scheme is recommended.

At step S516, it is judged whether the terminal supports the UP scheme. If so, the process proceeds with step S518. Otherwise, the process proceeds with step S524.

At step S518, it is judged whether the base station supports the UP scheme. If so, the process proceeds with step S520. Otherwise, the process proceeds with step S522.

At step S520, the NAS initiates attachment or tracking area update, and it is indicated in NAS signaling that the CP scheme in the CIoT optimization is supported, the UP scheme in the CIoT optimization is supported, and the UP scheme is recommended.

At step S524, the NAS initiates attachment or tracking area update, and it is indicated in NAS signaling that the CP scheme in the CIoT optimization is supported, the UP scheme in the CIoT optimization is not supported, and no scheme is recommended (the base station does not support the CP scheme that the terminal only supports).

At step S526, it is judged whether the terminal supports the UP scheme. If so, the process proceeds with step S528. Otherwise, the process proceeds with step S534.

At step S528, it is judged whether the base station supports the UP scheme. If so, the process proceeds with step S530. Otherwise, the process proceeds with step S532.

At step S530, the NAS initiates attachment or tracking area update, and it is indicated in NAS signaling that the CP scheme in the CIoT optimization is not supported, the UP scheme in the CIoT optimization is supported, and the UP scheme is recommended.

At step S532, the NAS initiates attachment or tracking area update, and it is indicated in NAS signaling that the CP scheme in the CIoT optimization is not supported, the UP scheme in the CIoT optimization is supported, and no scheme is recommended (the base station does not support the UP scheme that the terminal only supports).

At step S534, the NAS initiates attachment or tracking area update, and it is indicated in NAS signaling that the CP or UP scheme in the CIoT optimization is not supported.

In another optional example, a method for NAS decision after receiving an attach message is provided, in which NAS of a terminal determines a scheme to be used based on its own capabilities and recommendations (the following four situations) by combining information in an attach accept message transmitted from an MME.

Situation 1

Figure 6:
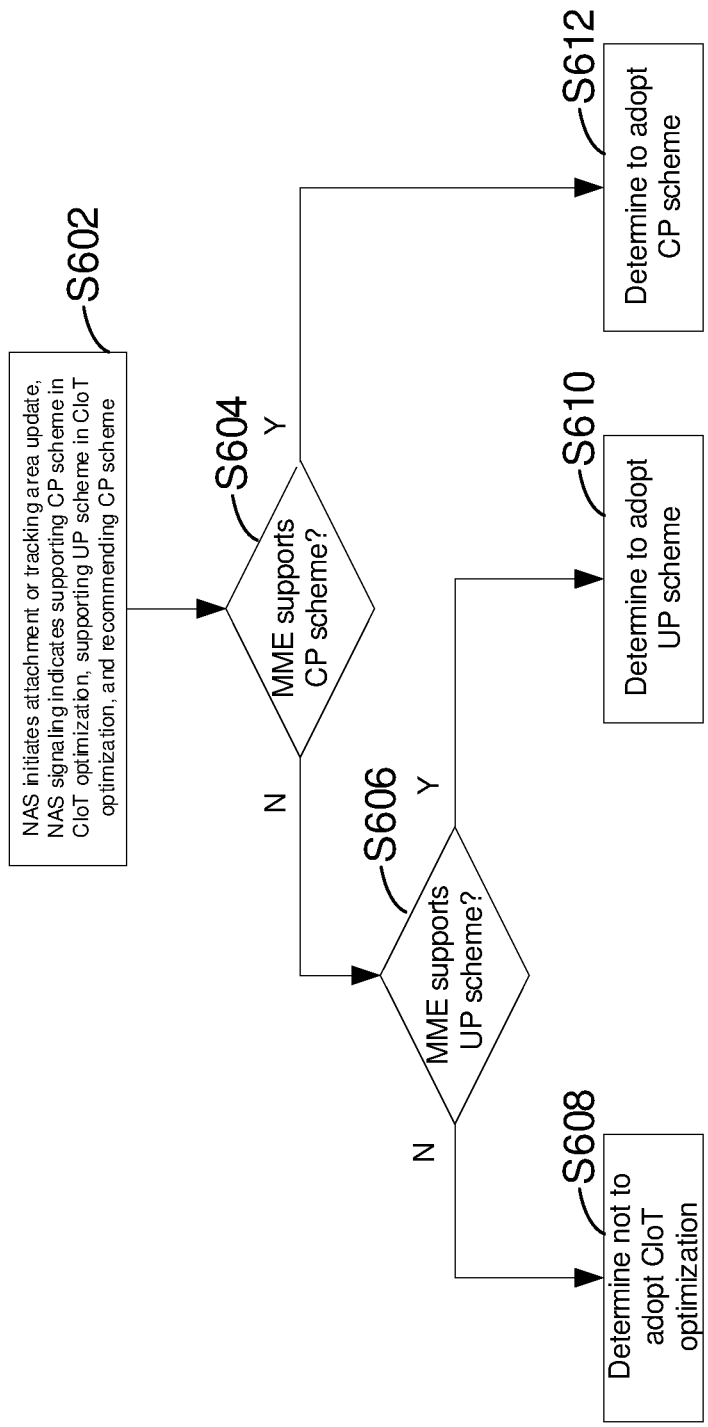
FIG. 6 is a first flowchart illustrating a method for NAS decision after receiving an attach message according to an optional example of the present disclosure.

FIG. 6 is a first flowchart illustrating a method for NAS decision after receiving an attach message according to an optional example of the present disclosure. As shown in FIG. 6, the process includes the following steps.

At step S602, when the NAS of the terminal initiates attachment or tracking area update, it indicates that the CP scheme in the CIoT optimization is supported, the UP scheme in the CIoT optimization is supported, and the CP scheme is recommended.

At step S604, it is judged whether the MME supports the CP scheme or not. If so, the process proceeds with step S612. Otherwise, the process proceeds with step S606.

At step S606, it is judged whether the MME supports the UP scheme. If so, the process proceeds with step S610. Otherwise, the process proceeds with step S608.

At step S608, it is determined that the CIoT optimization is not adopted.

At step S610, it is determined that the UP scheme is adopted.

At step S612, it is determined that the CP scheme is adopted.

Situation 2

Figure 7:
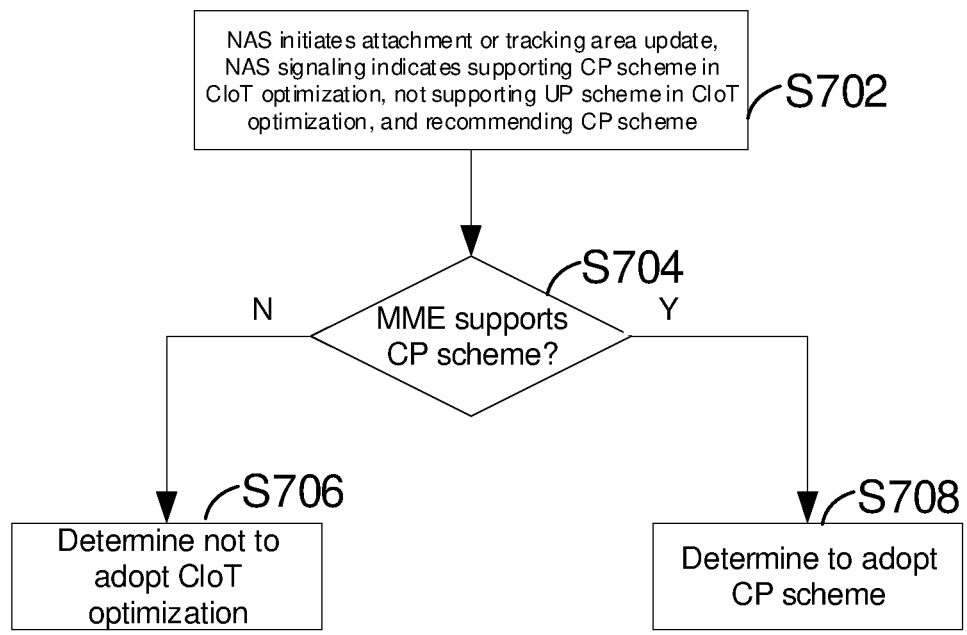
FIG. 7 is a second flowchart illustrating a method for NAS decision after receiving an attach message according to an optional example of the present disclosure.

FIG. 7 is a second flowchart illustrating a method for NAS decision after receiving an attach message according to an optional example of the present disclosure. As shown in FIG. 7, the process includes the following steps.

At step S702, when the NAS of the terminal initiates attachment or tracking area update, it indicates that the CP scheme in the CIoT optimization is supported, the UP scheme in the CIoT optimization is not supported, and the CP scheme is recommended.

At step S704, it is judged whether the MME supports the CP scheme or not. If so, the process proceeds with step S708. Otherwise, the process proceeds with step S706.

At step S706, it is determined that the CIoT optimization is not adopted.

At step S708, it is determined that the CP scheme is adopted.

Situation 3

Figure 8:
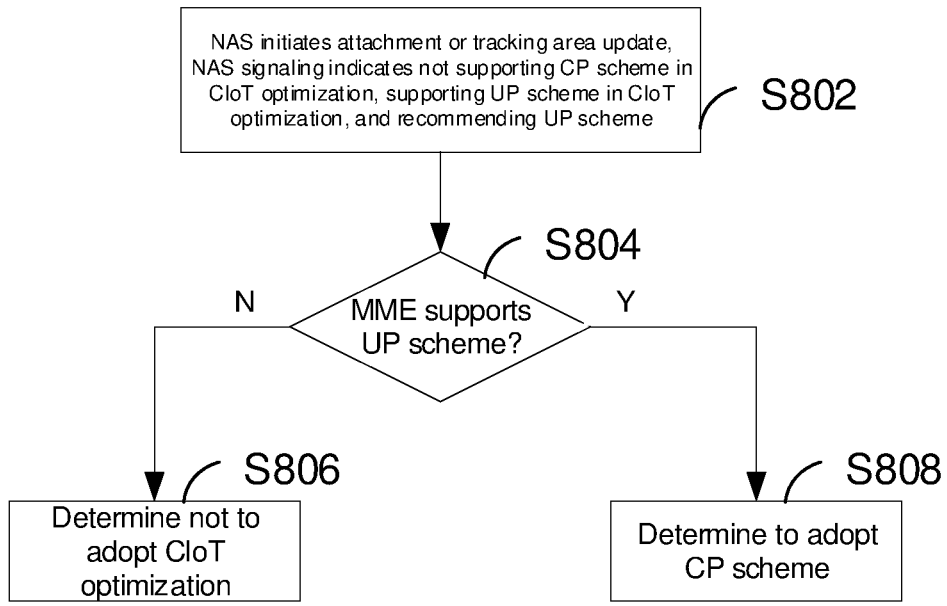
FIG. 8 is a third flowchart illustrating a method for NAS decision after receiving an attach message according to an optional example of the present disclosure.

FIG. 8 is a third flowchart illustrating a method for NAS decision after receiving an attach message according to an optional example of the present disclosure. As shown in FIG. 8, the process includes the following steps.

At step S802, when the NAS of the terminal initiates attachment or tracking area update, it indicates that the CP scheme in the CIoT optimization is not supported, the UP scheme in the CIoT optimization is supported, and the UP scheme is recommended.

At step S804, it is judged whether the MME supports the UP scheme or not. If so, the process proceeds with step S808. Otherwise, the process proceeds with step S806.

At step S806, it is determined that the CIoT optimization is not adopted.

At step S808, it is determined that the UP scheme is adopted.

Situation 4

Figure 9:
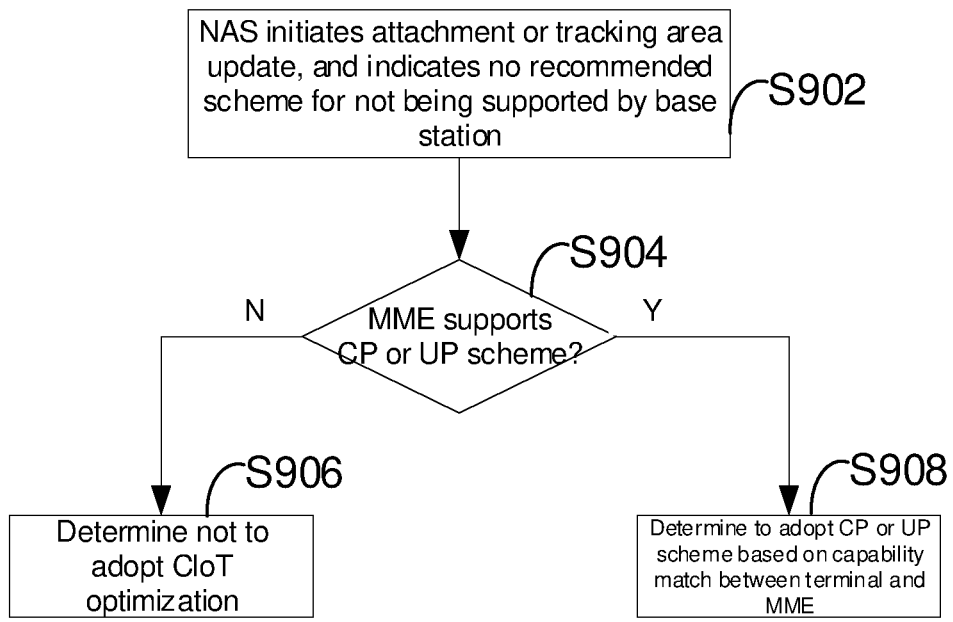
FIG. 9 is a fourth flowchart illustrating a method for NAS decision after receiving an attach message according to an optional example of the present disclosure.

FIG. 9 is a fourth flowchart illustrating a method for NAS decision after receiving an attach message according to an optional example of the present disclosure. As shown in FIG. 9, the process includes the following steps.

At step S902, when the NAS of the terminal initiates attachment or tracking area update, no scheme is recommended since the base station does not support any scheme.

At step S904, it is judged whether the MME supports the CP or UP scheme or not. If so, the process proceeds with step S908. Otherwise, the process proceeds with step S906.

At step S906, it is determined that the CIoT optimization is not adopted.

At step S908, it is determined that the CP or UP scheme is adopted based on a capability match between the terminal and the MME.

In yet another optional example, a method for NAS decision before transmitting data or signaling is provided, in which NAS of a terminal sends different indications to AS based on a scheme determined to be used, when there is data or signaling to be transmitted.

Situation 1

Figure 10:
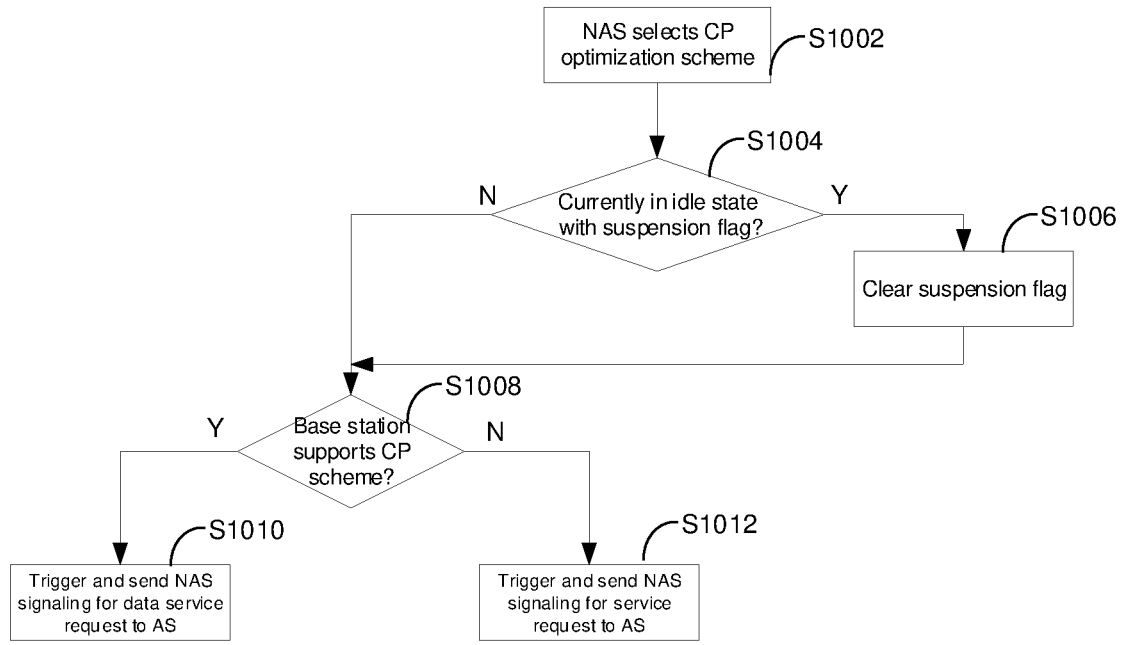
FIG. 10 is a first flowchart illustrating a method for NAS decision before transmitting data or signaling according to an optional example of the present disclosure.

FIG. 10 is a first flowchart illustrating a method for NAS decision before transmitting data or signaling according to an optional example of the present disclosure. As shown in FIG. 10, the process includes the following steps.

At step S1002, the NAS selects the CP optimization scheme.

At step S1004, it is judged whether it is currently in an idle state with a suspension flag or not. If so, the process proceeds with step S1006. Otherwise, the process proceeds with step S1008.

At step S1006, the suspension flag is cleared.

At step S1008, it is judged whether the base station supports the CP scheme or not. If so, the process proceeds with step S1010. Otherwise, the process proceeds with step S1012.

At step S1010, a NAS signaling for data service request is triggered and sent to the AS.

At step S1012, a NAS signaling for service request is triggered and sent to the AS.

Situation 2

Figure 11:
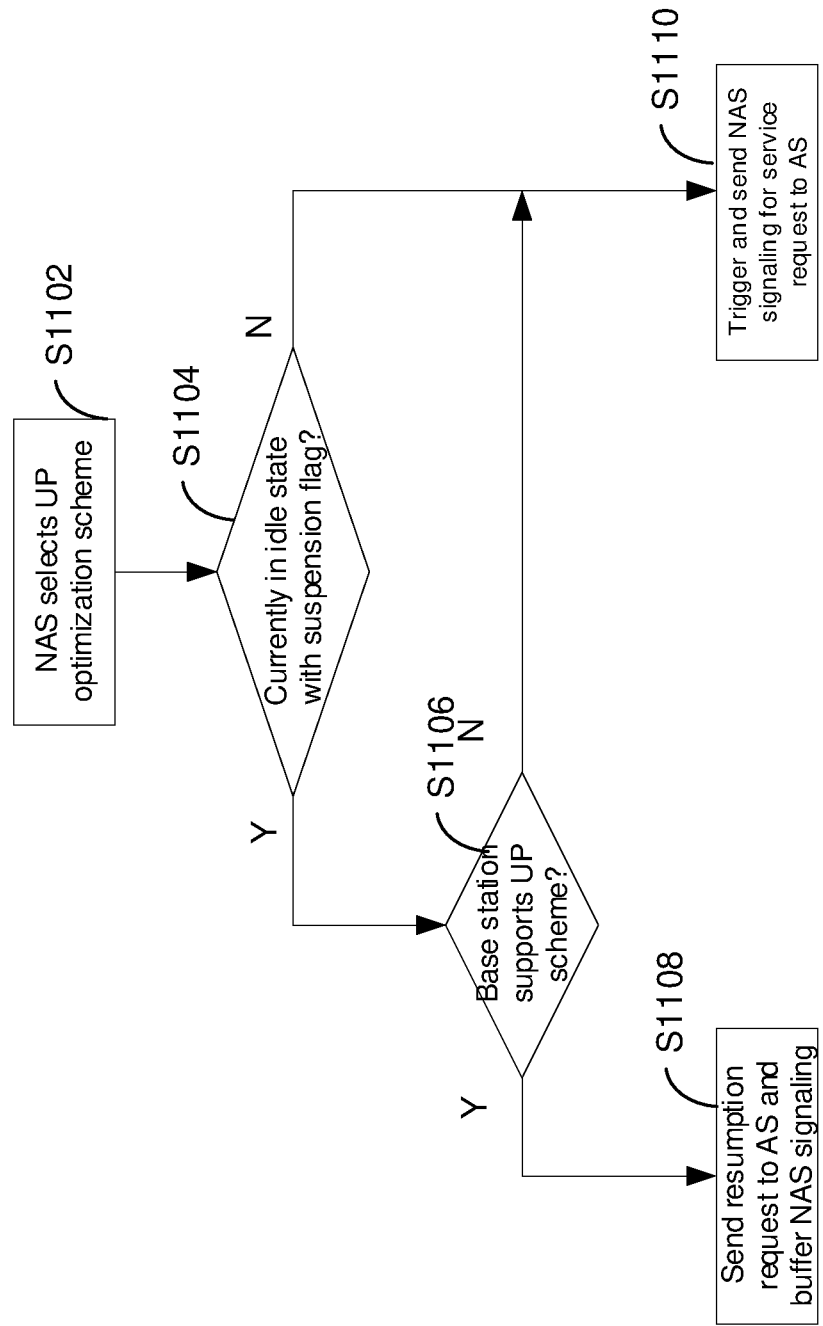
FIG. 11 is a second flowchart illustrating a method for NAS decision before transmitting data or signaling according to an optional example of the present disclosure.

FIG. 11 is a second flowchart illustrating a method for NAS decision before transmitting data or signaling according to an optional example of the present disclosure. As shown in FIG. 11, the process includes the following steps.

At step S1102, the NAS selects the UP optimization scheme.

At step S1104, it is judged whether it is currently in an idle state with a suspension flag or not. If so, the process proceeds with step S1106. Otherwise, the process proceeds with step S1110.

At step S1106, it is judged whether the base station supports the UP scheme or not. If so, the process proceeds with step S1108. Otherwise, the process proceeds with step S1110.

At step S1108, a resumption request is sent to the AS and the NAS signaling is buffered.

At step S1110, a NAS signaling for service request is triggered and sent to the AS.

Optionally, the above step S404 can include, but not limited to, the following situations.

When the suspension retention indication has a first predetermined value, the predetermined operation indicated by the suspension retention indication is performed. The predetermined operation includes one of: retaining the suspension flag, the NAS to be in an idle state with the suspension flag, entering the idle state with the suspension flag, and maintaining the idle state with the suspension flag.

When the suspension retention indication has a second predetermined value, the suspension flag is cleared, the NAS is to be in an idle state without the suspension flag, the NAS enters the idle state without the suspension flag, and the NAS leaves the idle state with the suspension flag.

When the NB-IoT terminal type indication has a third predetermined value, the terminal type of the terminal is obtained, as an NB-IoT terminal.

When the NB-IoT terminal type indication has a fourth predetermined value, the terminal type of the terminal is obtained, as a non-NB-IoT terminal.

When the NAS signaling handling indication has a fifth predetermined value, the buffered NAS signaling is sent to the AS of the terminal.

When the NAS signaling handling indication has a sixth predetermined value, the buffered NAS signaling is not sent to the AS of the terminal.

Embodiment 4

In this embodiment, a method for connection handling is provided. FIG. 12 is a fourth flowchart illustrating a method for connection handling according to an embodiment of the present disclosure. As shown in FIG. 12, the process flow includes the following steps.

At step S1202, a first downlink message and/or a first resume identity is transmitted to a terminal. The first resume identity is to be used by the terminal for transmitting an uplink message and/or a second resume identity based on the first resume identity.

Optionally, the above method for connection handling can, but not limited to, be applied in a UP optimization scenario, e.g., a UP optimization in MTC.

Optionally, the above method for connection handling can, but not limited to, be applied in base station, e.g., a macro base station, a micro base station, a pico base station or a home base station.

With the above steps, a first downlink message and/or a first resume identity is sent to a terminal, and an uplink message and/or a second resume identity transmitted from the terminal based on the first resume identity is received. It can be seen that, with the above solution, it is possible to receive the second resume identity transmitted from the terminal based on the first resume identity. In this way, the consistency in operations between the terminal and the base station can be achieved and the problems associated with inconsistent operations in the user plane optimization in the related art can be solved.

In this embodiment, the terminal can transmit the uplink message and/or the second resume identity to the base station transmitting the first resume identity, or to another base station.

Optionally, after the above step S1202, the uplink message and/or the second resume identity transmitted from the terminal based on the first resume identity can be received.

It is to be noted here that, the base station that receives the uplink message and/or the second resume identity transmitted from the terminal based on the first resume identity can be the base station transmitting the first resume identity, or another base station.

Optionally, the first downlink message can, as a non-limiting example, carry information indicating a format of the first resume identity transmitted to the terminal.

Optionally, the information indicating the format of the first resume identity can, as a non-limiting example, include: information indicating a meaning of information carried in the first resume identity and information indicating a length of the information carried in the first resume identity.

Optionally, the first downlink message can, as a non-limiting example, include information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the method can, as a non-limiting example, further include: obtaining, based on the two of the first predetermined length, the second predetermined length and the third predetermined length included in the first downlink message, the other one of the first predetermined length, the second predetermined length and the third predetermined length.

Optionally, the uplink message can, as a non-limiting example, carry information indicating a format of the second resume identity transmitted from the terminal.

Optionally, the method can, as a non-limiting example, further include, prior to the above step S1204, transmitting to the terminal a second downlink message carrying information indicating a format of the second resume identity.

It is to be noted here that, the base station that transmits the second downlink message to the terminal can be the base station transmitting the first resume identity, or another base station.

Optionally, the second downlink message can, as a non-limiting example, include information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the method can, as a non-limiting example, further include: obtaining, based on the two of the seventh predetermined length, the eighth predetermined length and the ninth predetermined length included in the uplink message, the other one of the seventh predetermined length, the eighth predetermined length and the ninth predetermined length.

Optionally, the second downlink message can, as a non-limiting example, include one of: system information, a Message 2 for allocating to the terminal resources required for transmission of the connection resumption request message, and a Message 4 for allocating to the terminal resources required for transmission of the connection resumption request message.

Embodiment 5

According to an embodiment of the present disclosure, an apparatus for connection handling is also provided. The apparatus can implement the above embodiments and preferable embodiments, and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

FIG. 13 is a first block diagram showing a structure of an apparatus for connection handling according to an embodiment of the present disclosure. As shown in FIG. 13, the apparatus includes the following modules.

1) A first receiving module 152 is configured to receive a connection request that requests for establishing or resuming a connection with a base station.

2) An instructing module 134 is coupled to the first receiving module and configured to instruct a Non-Access Stratum (NAS) of a terminal to perform a predetermined operation based on an obtained first connection result corresponding to the connection request.

Optionally, the above apparatus for connection handling can, but not limited to, be applied in a UP optimization scenario, e.g., a UP optimization in MTC.

Optionally, the above apparatus for connection handling can, but not limited to, be applied in a terminal, such as a mobile phone, a tablet computer, a laptop computer, an intelligent wearable device, or the like. Optionally, the above apparatus for connection handling can, but not limited to, be applied in the AS of the terminal.

With the above apparatus, a first receiving module receives a connection request that requests for establishing or resuming a connection with a base station. An instructing module instructs a NAS of a terminal to perform a predetermined operation based on an obtained first connection result corresponding to the connection request. It can be seen that, with the above solution, it is possible to instruct the NAS of the terminal to perform a predetermined operation based on the first connection result of the connection request. In this way, the consistency in operations between the AS and NAS of the terminal can be achieved and the problems associated with inconsistent operations in the user plane optimization in the related art can be solved.

Optionally, the instructing module can instruct the NAS of the terminal to perform the predetermined operation based on the obtained first connection result according to one of the following schemes.

Scheme 1: Transmit to the NAS of the terminal one or more first indication messages carrying indication information.

Scheme 2: Transmit to the NAS of the terminal the one or more first indication messages carrying the indication information and a second indication message indicating a second connection result Scheme 3: Transmit to the NAS of the terminal a third indication message indicating the second connection result and carrying the indication information.

Here, in the above three schemes, the indication information instructs the NAS of the terminal to perform the predetermined operation.

Optionally, the indication information can include, but not limited to, at least one of the following.

Indication 1: a suspension retention indication for instructing one of: the NAS to retain a suspension flag, the NAS to clear the suspension flag, the NAS to be in an idle state with the suspension flag, the NAS to be in an idle state without the suspension flag, the NAS to enter the idle state with the suspension flag, the NAS to enter the idle state without the suspension flag, the NAS to maintain the idle state with the suspension flag, and the NAS to leave the idle state with the suspension flag.

Indication 2: a Narrow Band Internet of Things (NB-IoT) terminal type indication for indicating to the NAS that the terminal is or is not an NB-IoT terminal.

Indication 3: a NAS signaling handling indication for instructing the NAS to or not to send a buffered NAS signaling to an Access Stratum (AS) of the terminal.

Indication 4: a connection resumption failure indication for instructing the NAS to send the buffered NAS signaling to the AS of the terminal and to enter a connected state.

Indication 5: a connection suspension indication for instructing the NAS to enter the idle state with the suspension flag. In an example of the present disclosure, upon receiving a reestablishment rejection message with a suspension flag, the AS of the terminal can sends the connection suspension indication to the NAS of the terminal, instructing the NAS of the terminal to enter the idle state with the suspension flag.

Indication 6: a base station supporting Control Plane (CP) optimization indication indicating whether a base station supports a CP optimization scheme or not. Here, whether the base station supports the CP optimization scheme or not can be determined based on whether the CP optimization scheme is recommended in NAS signaling for attachment and/or tracking area update or whether the CP optimization scheme is adopted for transmission of data and/or signaling.

Indication 7: a base station supporting User Plane (UP) optimization indication indicating whether a base station supports a UP optimization scheme or not. Here, whether the base station supports the UP optimization scheme or not can be determined based on whether the UP optimization scheme is recommended in NAS signaling for attachment and/or tracking area update or whether the UP optimization scheme is adopted for transmission of data and/or signaling.

Optionally, when the suspension retention indication has a first predetermined value, the suspension retention indication can, as a non-limiting example, instruct one of: the NAS to retain the suspension flag, the NAS to be in an idle state with the suspension flag, the NAS to enter the idle state with the suspension flag, and the NAS to maintain the idle state with the suspension flag. When the suspension retention indication has a second predetermined value, the suspension retention indication instructs one of: the NAS to clear the suspension flag, the NAS to be in an idle state without the suspension flag, the NAS to enter the idle state without the suspension flag, and the NAS to leave the idle state with the suspension flag.

Optionally, the suspension retention indication can, but not limited to, be a 1-bit value. For example, the first predetermined value can, but not limited to, be 1 or "failure to resume with suspend", and the second predetermined value can, but not limited to, be 0 or "failure to resume without suspend".

Optionally, the first connection result can, as a non-limiting example, include one of: the AS of the terminal being unable to transmit a connection resumption request message for failing to pass an Access Barring test, the AS of the terminal receiving a connection rejection message carrying suspension information, the AS of the terminal receiving a connection rejection message carrying no suspension information, the AS of the terminal receiving a reestablishment rejection message carrying suspension information, timeout of a timer started after the AS of the terminal has transmitted a Message 3, "Msg3", the AS of the terminal being unable to transmit a connection resumption request message as a current serving base station does not support the UP optimization scheme, and the AS of the terminal being unable to transmit a connection resumption request message as there is no AS context information stored.

Optionally, the NB-IoT terminal type indication can, as a non-limiting example, indicate to the NAS that the terminal is an NB-IoT terminal when the NB-IoT terminal type indication has a third predetermined value, and the NB-IoT terminal type indication can, as a non-limiting example, indicate to the NAS that the terminal is not an NB-IoT terminal when the NB-IoT terminal type indication has a fourth predetermined value.

Optionally, the NB-IoT terminal type indication can, but not limited to, be a 1-bit value. The third predetermined value can, but not limited to, be 1 and the fourth predetermined value can, but not limited to, be 0.

Optionally, the first connection result can, as a non-limiting example, include: the AS of the terminal transferring an extended wait timer to the NAS after receiving a connection rejection message.

Optionally, the NAS signaling handling indication can, as a non-limiting example, instruct the NAS to send the buffered NAS signaling to the AS of the terminal when the NAS signaling handling indication has a fifth predetermined value, and/or the NAS signaling handling indication can, as a non-limiting example, instruct the NAS to enter the connected. The NAS signaling handling indication can, as a non-limiting example, instruct the NAS not to send the buffered NAS signaling to the AS of the terminal when the NAS signaling handling indication has a sixth predetermined value.

Optionally, the NAS signaling handling indication can, but not limited to, be a 1-bit value. The fifth predetermined value can, but not limited to, be 1 and the sixth predetermined value can, but not limited to, be 0.

Optionally, the first connection result can, as a non-limiting example, include one of: the AS of the terminal being unable to transmit a connection resumption request message as a current serving base station does not support the UP optimization scheme, and the AS of the terminal being unable to transmit a connection resumption request message as there is no AS context information stored.

Optionally, the apparatus can further include a recording module coupled to the first receiving module 132 and configured to record the connection request as a connection establishment request or a connection resumption request, depending on a request type of the connection request.

Optionally, the second connection result can, as a non-limiting example, include one of: a connection resumption failure, "failure to resume the RRC connection", and a connection establishment failure, "failure to establish the RRC connection".

In the following, the process for connection handling will be described and explained with reference to some optional examples.

In an optional example, the AS of the terminal receives a connection resumption request indication from the NAS of the terminal, but finds out that the base station does not support the UP optimization scheme or no AS context information is stored. In this case, the AS of the terminal can mark that the NAS has requested for resumption, clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, based on the mark that the NAS has requested for resumption, the AS of the terminal can sends a connection resumption failure indication, "RRC connection resume has filed", to the NAS of the terminal.

In another optional example, the AS of the terminal receives a connection resumption request indication from the NAS of the terminal, but finds out that the base station does not support the UP optimization scheme or no AS context information is stored. In this case, the AS of the terminal can mark that the NAS has requested for resumption, clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, based on the mark that the NAS has requested for resumption, the AS of the terminal can send a NAS signaling handling indication to the NAS of the terminal for instructing the NAS to send a buffered NAS signaling to the AS of the terminal.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and transmit a connection establishment request message, "RRCConnectionRequest", instead of a connection resumption request message, "RRCConnectionResumeRequest". Then, when the terminal receives a connection establishment message, "RRCConnectionSetup" from the base station, if the AS of the terminal does not have any NAS signaling to transmit before transmitting an "RRCConnectionSetupComplete" message, the AS of the terminal can send a NAS signaling handling indication to the NAS of the terminal for instructing the NAS to send a buffered NAS signaling to the AS of the terminal.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and send a resumption failure indication and/or a suspension retention indication having the second predetermined value to the NAS, for instructing the NAS to enter the idle state without the suspension flag. Implicitly, the NAS of the terminal can clear the buffered NAS signaling and initiate the connection establishment request again either immediately or after a period of time.

In another optional example, the AS of the terminal receives a connection resumption request indication from the NAS of the terminal, but finds out that the base station does not support the UP optimization scheme or no AS context information is stored. In this case, the AS of the terminal can clear the stored AS context (if any) and send a "failure to resume without suspend" indication to the NAS, for instructing the NAS to enter the idle state without the suspension flag. Implicitly, the NAS of the terminal can clear the buffered NAS signaling and initiate the connection establishment request again either immediately or after a period of time.

Optionally, the second indication message or the third indication message can, as a non-limiting example, include a resumption failure indication, "failure to resume".

Optionally, the third indication message can, as a non-limiting example, include one of: "failure to resume with suspend" and "failure to resume without suspend".

It should be noted that each of the above-described modules can be implemented by means of software or hardware, and the latter can be implemented by, but not limited to, the following manner: the above-mentioned modules are located at the same processor, or the above-mentioned modules are distributed over a plurality of processors.

Embodiment 6

According to an embodiment of the present disclosure, an apparatus for connection handling is also provided. The apparatus can implement the above embodiments and preferable embodiments, and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

FIG. 14 is a second block diagram showing a structure of an apparatus for connection handling according to an embodiment of the present disclosure. As shown in FIG. 14, the apparatus includes the following modules.

1) A second receiving module 142 is configured to receive a first downlink message and/or a first resume identity transmitted from a first base station.

2) A first transmitting module 144 is coupled to the second receiving module 142 and configured to transmit an uplink message and/or a second resume identity to a second base station based on the first resume identity.

Optionally, the above apparatus for connection handling can, but not limited to, be applied in a UP optimization scenario, e.g., a UP optimization in MTC.

Optionally, the above apparatus for connection handling can, but not limited to, be applied in a terminal, such as a mobile phone, a tablet computer, a laptop computer, an intelligent wearable device, or the like. Optionally, the above apparatus for connection handling can, but not limited to, be applied in the NAS of the terminal.

With the above apparatus, a second receiving module receives a first downlink message and/or a first resume identity transmitted from a base station. A first transmitting module 144 transmits an uplink message and/or a second resume identity to a base station based on the first resume identity. It can be seen that, with the above solution, the first transmitting module 144 transmits an uplink message and/or a second resume identity to a base station based on the first resume identity transmitted from the base station. In this way, the consistency in operations between the terminal and the base station can be achieved and the problems associated with inconsistent operations in the user plane optimization in the related art can be solved.

In this embodiment, the first base station and the second base station can be the same base station or different base stations.

Optionally, the first downlink message can, as a non-limiting example, carry information indicating a format of the first resume identity transmitted from the first base station.

Optionally, the information indicating the format of the first resume identity can, as a non-limiting example, include: information indicating a meaning of information carried in the first resume identity and information indicating a length of the information carried in the first resume identity.

Optionally, the first downlink message can, as a non-limiting example, include information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the solution can, as a non-limiting example, further include: obtaining, based on the two of the first predetermined length, the second predetermined length and the third predetermined length included in the first downlink message, the other one of the first predetermined length, the second predetermined length and the third predetermined length.

Optionally, the uplink message can, as a non-limiting example, carry information indicating a format of the second resume identity transmitted to the second base station.

Optionally, the information indicating the format of the second resume identity can, as a non-limiting example, include: information indicating a meaning of information carried in the second resume identity and information indicating a length of the information carried in the second resume identity.

Optionally, the uplink message can, as a non-limiting example, include information indicating at least two of: a total length of the second resume identity being a fourth predetermined length, a length of base station information carried in the second resume identity being a fifth predetermined length, and a length of terminal information carried in the second resume identity being a sixth predetermined length.

Optionally, the uplink message includes two of the fourth predetermined length, the fifth predetermined length and the sixth predetermined length, and the solution can, as a non-limiting example, further include: obtaining, based on the two of the fourth predetermined length, the fifth predetermined length and the sixth predetermined length included in the uplink message, the other one of the fourth predetermined length, the fifth predetermined length and the sixth predetermined length.

Optionally, the first transmitting module can, as a non-limiting example, construct and transmit the second resume identity by: extracting, from the base station information having the second predetermined length in the first resume identity, information having the fifth predetermined information according to a first predetermined rule as the base station information in the second resume identity; extracting, from the terminal information having the third predetermined length in the first resume identity, information having the sixth predetermined information according to a second predetermined rule as the terminal information in the second resume identity; and transmitting the second resume identity to the second base station.

Figure 15:
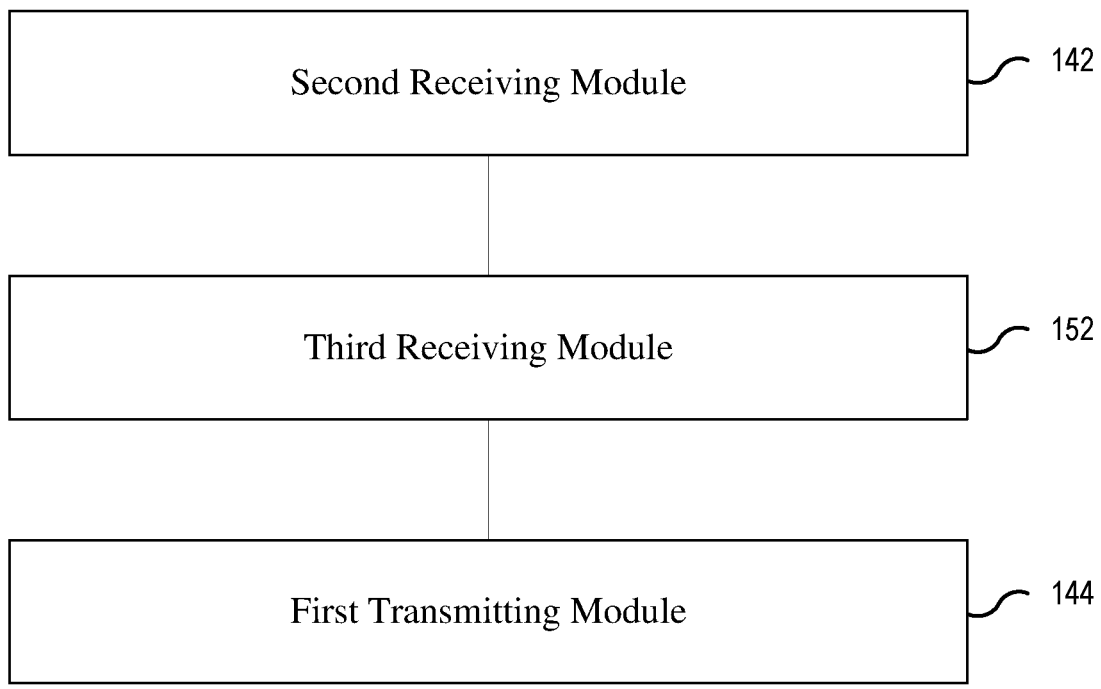
FIG. 15 is a third block diagram showing a structure of an apparatus for connection handling according to an embodiment of the present disclosure.

FIG. 15 is a third block diagram showing a structure of an apparatus for connection handling according to an embodiment of the present disclosure. As shown in FIG. 15, optionally, the apparatus can further include a third receiving module 152 coupled between the second receiving module 142 and the first transmitting module 144, and configured to receive a second downlink message transmitted from the first base station or the second base station. The second downlink message can carry information indicating a format of the second resume identity.

Optionally, the second downlink message can, as a non-limiting example, include information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the method can, as a non-limiting example, further include: obtaining, based on the two of the seventh predetermined length, the eighth predetermined length and the ninth predetermined length included in the uplink message, the other one of the seventh predetermined length, the eighth predetermined length and the ninth predetermined length.

Optionally, the second resume identity can, as a non-limiting example, be constructed and transmitted to the second base station by: extracting, from the base station information having the second predetermined length in the first resume identity, information having the eighth predetermined information according to a third predetermined rule as the base station information in the second resume identity; extracting, from the terminal information having the third predetermined length in the first resume identity, information having the ninth predetermined information according to a fourth predetermined rule as the terminal information in the second resume identity; and transmitting the second resume identity to the second base station.

Optionally, the second downlink message can, as a non-limiting example, include one of: system information, a Message 2 for allocating to the terminal resources required for transmission of the connection resumption request message, and a Message 4 for allocating to the terminal resources required for transmission of the connection resumption request message.

Optionally, the information indicating the format of the second resume identity can, as a non-limiting example, include one of first indication information and second indication information. The first indication information instructs, when having a first predetermined value, one of: extracting Most Significant Bits (MSBs) of a tenth predetermined length from the first resume identity as the second resume identity; and extracting MSBs of the tenth predetermined length from the first resume identity to fill in the second resume identity, or instructs, when having a second predetermined value, one of: extracting Least Significant Bits (LSBs) of an eleventh predetermined length from the first resume identity as the second resume identity; and extracting LSBs of the eleventh predetermined length from the first resume identity to fill in the second resume identity. The second indication information indicates that the second resume identity has a first format when the second indication information has the first predetermined value, or that the second resume identity has a second format, or does not have the first format, when the second indication information has the second predetermined value. The first format and the second format are predefined formats.

For example, the information indicating the format of the second resume identity can include 1-bit indication information. The indication information instructs, when having a first predetermined value, extracting MSBs of a tenth predetermined length from the first resume identity as the second resume identity, or extracting MSBs of the tenth predetermined length from the first resume identity to fill in the second resume identity, or instructs, when having a second predetermined value, extracting LSBs of an eleventh predetermined length from the first resume identity as the second resume identity, or extracting LSBs of the eleventh predetermined length from the first resume identity to fill in the second resume identity. Alternatively, the information can be 1-bit indication information, which indicates that the second resume identity has a first format when it has the first predetermined value, or that the second resume identity has a second format, or does not have the first format, when it has the second predetermined value. The first format and the second format are predefined formats.

Optionally, the information indicating the format of the second resume identity can include third indication information or fourth indication information. The third indication information instructs, when having a first predetermined value: extracting Most Significant Bits (MSBs) of a tenth predetermined length from the first resume identity as the second resume identity; or extracting MSBs of the tenth predetermined length from the first resume identity to fill in the second resume identity. The third indication information instructs, when having a second predetermined value: extracting Least Significant Bits (LSBs) of an eleventh predetermined length from the first resume identity as the second resume identity; or extracting LSBs of the eleventh predetermined length from the first resume identity to fill in the second resume identity. The third indication information instructs, when having a third predetermined value: extracting middle bits of a twelfth predetermined length from the first resume identity as the second resume identity; and extracting middle bits of the twelfth predetermined length from the first resume identity to fill in the second resume identity. The fourth indication information indicates that the second resume identity has a first format when the fourth indication information has the first predetermined value, that the second resume identity has a second format when the fourth indication information has the second predetermined value, or that the second resume identity has a third format when the fourth indication information has the third predetermined value. The first format, the second format and the third format are predefined formats.

For example, the information indicating the format of the second resume identity can include 2-bit indication information. The indication information instructs, when having a first predetermined value: extracting MSBs of a tenth predetermined length from the first resume identity as the second resume identity; or extracting MSBs of the tenth predetermined length from the first resume identity to fill in the second resume identity. The indication information instructs, when having a second predetermined value: extracting LSBs of an eleventh predetermined length from the first resume identity as the second resume identity; or extracting LSBs of the eleventh predetermined length from the first resume identity to fill in the second resume identity. The indication information instructs, when having a third predetermined value: extracting middle bits of a twelfth predetermined length from the first resume identity as the second resume identity; and extracting middle bits of the twelfth predetermined length from the first resume identity to fill in the second resume identity. Alternatively, the information can be 2-bit indication information, which indicates that the second resume identity has a first format when it has the first predetermined value, that the second resume identity has a second format when it has the second predetermined value, or that the second resume identity has a third format when it has the third predetermined value. The first format, the second format and the third format are predefined formats.

Optionally, the second downlink message can include one of: indication information instructing extracting a portion from the first resume identity as the second resume identity, and indication information instructing extracting a predetermined portion of information from the first resume identity to fill in the second resume identity.

For example, the second downlink message can include indication information which instructs extracting a portion from the first resume identity as the second resume identity, or extracting a portion from the first resume identity to fill in the second resume identity Optionally, the second downlink message can include fifth indication information or sixth indication information. The fifth indication information or sixth indication information instructs: when having a first predetermined value, extracting Most Significant Bits (MSBs) of a tenth predetermined length from the first resume identity as the second resume identity; or extracting MSBs of the tenth predetermined length from the first resume identity to fill in the second resume identity, or when having a second predetermined value: extracting Least Significant Bits (LSBs) of an eleventh predetermined length from the first resume identity as the second resume identity; and extracting LSBs of the eleventh predetermined length from the first resume identity to fill in the second resume identity. Alternatively, the fifth indication information or sixth indication information indicates that the second resume identity has a first format when the fifth indication information or sixth indication information has the first predetermined value, or that the second resume identity has a second format, or does not have the first format, when the fifth indication information or sixth indication information has the second predetermined value. The first format and the second format are predefined formats.

For example, the second downlink message can include 1-bit or 2-bit indication information. The indication information instructs: when having a first predetermined value, extracting MSBs of a tenth predetermined length from the first resume identity as the second resume identity; or extracting MSBs of the tenth predetermined length from the first resume identity to fill in the second resume identity, or when having a second predetermined value: extracting LSBs of an eleventh predetermined length from the first resume identity as the second resume identity; and extracting LSBs of the eleventh predetermined length from the first resume identity to fill in the second resume identity. Alternatively, the indication information can be 1-bit or 2-bit indication information, which indicates that the second resume identity has a first format when it has the first predetermined value, or that the second resume identity has a second format, or does not have the first format, when it has the second predetermined value. The first format and the second format are predefined formats.

Optionally, the information indicating the format of the fourth resume identity and/or the coding rule for the fourth resume identity can include at least one of: indication information indicating whether the fourth resume identity has a format representing a truncated resume identity, indication information instructing filling the third resume identity in the fourth resume identity, and indication information indicating a predetermined portion of the fourth resume identity to be valid.

For example, the information indicating the format of the fourth resume identity and/or the coding rule for the fourth resume identity can indicate whether the fourth resume identity has a format representing a truncated resume identity, instruct filling the third resume identity in the fourth resume identity, or indicate a portion of the fourth resume identity to be valid.

Optionally, the information indicating the format of the fourth resume identity and/or the coding rule for the fourth resume identity can includes at least one of seventh indication information or eighth indication information. The seventh indication information or eighth indication information indicates that the fourth resume identity has the format representing the truncated resume identity when the seventh indication information or eighth indication information has a first predetermined value, or that the fourth resume identity has a format of a full resume identity or has a format not representing the truncated resume identity when the seventh indication information or eighth indication information has a second predetermined value. Alternatively, the seventh indication information or eighth indication information instructs filling the third resumption indication in Most Significant Bits (MSBs) of a tenth predetermined length in the fourth resumption indication or indicates the MSBs of the tenth predetermined length in the fourth resumption indication to be valid when the seventh indication information or eighth indication information has the first predetermined value, or instructs filling the third resumption indication in Least Significant Bits (LSBs) of an eleventh predetermined length in the fourth resumption indication or indicates the LSBs of the eleventh predetermined length of the fourth resumption indication to be valid when the seventh indication information or eighth indication information has the second predetermined value.

For example, the information indicating the format of the fourth resume identity and/or the coding rule for the fourth resume identity can include 1-bit or 2-bit indication information. The indication information indicates that the fourth resume identity has the format representing the truncated resume identity when it has a first predetermined value, or that the fourth resume identity has a format of a full resume identity or has a format not representing the truncated resume identity when it has a second predetermined value. Alternatively, the information instructs filling the third resumption indication in MSBs of a tenth predetermined length in the fourth resumption indication or indicates the MSBs of the tenth predetermined length in the fourth resumption indication to be valid when it has the first predetermined value, or instructs filling the third resumption indication in LSBs of an eleventh predetermined length in the fourth resumption indication or indicates the LSBs of the eleventh predetermined length of the fourth resumption indication to be valid when it has the second predetermined value.

Optionally, the format representing the truncated resume identity is a predefined format. Alternatively, the format representing the truncated resume identity has a first predetermined portion of bits being valid and a second predetermined portion of bits being padding bits. The information representing the truncated resume identity has a length of 40 bits.

For example, the format representing the truncated resume identity can be a predefined format. Alternatively, only some of the bits in the format are valid, while others are padding bits. The information representing the truncated resume identity can have a length of 40 bits.

Optionally, the tenth, eleventh and twelfth predetermined lengths can be the same or different.

Optionally, the tenth, eleventh and twelfth predetermined lengths can be predefined or indicated in a predetermined scheme. The predetermined scheme includes using a system message or a downlink message.

For example, the tenth, eleventh and/or twelfth predetermined lengths can be predefined or indicated using a system message or another downlink message.

Optionally, the above indication information can be one bit. The first predetermined value can be 1 or 0, or the second predetermined value can be 0 or 1.

Optionally, each of the first, second, third, fourth, fifth, sixth, seventh and/eighth indication information can be 1-bit information which includes Boolean information or enumerative information or multi-bit information which includes enumerative information.

Embodiment 7

According to an embodiment of the present disclosure, an apparatus for connection handling is also provided. The apparatus can implement the above embodiments and preferable embodiments, and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 16:
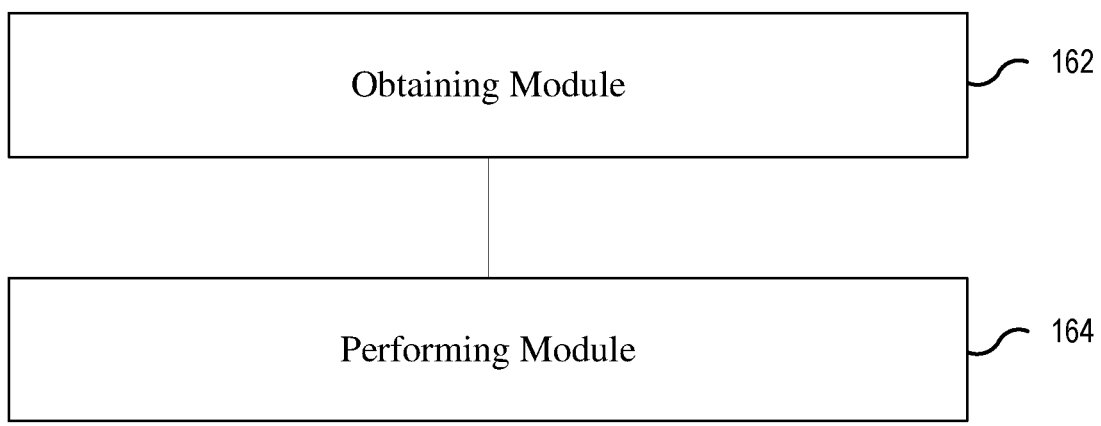
FIG. 16 is a fourth block diagram showing a structure of an apparatus for connection handling according to an embodiment of the present disclosure.

FIG. 16 is a fourth block diagram showing a structure of an apparatus for connection handling according to an embodiment of the present disclosure. As shown in FIG. 16, the apparatus includes the following modules.

1) An obtaining module 162 is configured to obtain indication information transmitted from an Access Stratum (AS) of a terminal. The indication information instructs a Non-Access Stratum (NAS) of the terminal to perform a predetermined operation.

2) A performing module 164 is coupled to the obtaining module 162 and configured to perform the predetermined operation based on the indication information.

Optionally, the above apparatus for connection handling can, but not limited to, be applied in a UP optimization scenario, e.g., a UP optimization in MTC.

Optionally, the above apparatus for connection handling can, but not limited to, be applied in a terminal, such as a mobile phone, a tablet computer, a laptop computer, an intelligent wearable device, or the like. Optionally, the above apparatus for connection handling can, but not limited to, be applied in the NAS of the terminal.

With the above steps, an obtaining module obtains indication information transmitted from an AS of a terminal. The indication information instructs a NAS of the terminal to perform a predetermined operation. A performing module performs the predetermined operation based on the indication information. It can be seen that, with the above solution, it is possible to perform the predetermined operation based on the indication from the AS of the terminal. In this way, the consistency in operations between the AS and NAS of the terminal can be achieved and the problems associated with inconsistent operations in the user plane optimization in the related art can be solved.

Optionally, the obtaining module can obtain an indication type of the indication information. Here, the indication type can include at least one of: a suspension retention indication, a Narrow Band Internet of Things (NB-IoT) terminal type indication, a NAS signaling handling indication, a connection resumption failure indication, a connection suspension indication, a base station supporting Control Plane (CP) optimization indication and a base station supporting User Plane (UP) optimization indication.

When the indication type includes the suspension retention indication, the predetermined operation indicated by the suspension retention indication is performed based on the suspension retention indication. The suspension retention indication instructs one of: retaining a suspension flag, clearing the suspension flag, the NAS to be in an idle state with the suspension flag, the NAS to be in an idle state without the suspension flag, entering the idle state with the suspension flag, entering the idle state without the suspension flag, maintaining the idle state with the suspension flag, and leaving the idle state with the suspension flag.

When the indication type includes the NB-IoT terminal type indication, a terminal type of the terminal is obtained based on the NB-IoT terminal type indication.

When the indication type includes the NAS signaling handling indication, a buffered NAS signaling is, or is not, sent to the AS of the terminal based on the NAS signaling handling indication.

When the indication type includes the connection resumption failure indication, the NAS sends the buffered NAS signaling to the AS of the terminal and enters a connected state based on the connection resumption failure indication.

When the indication type includes the connection suspension indication, the NAS enters the idle state with the suspension flag based on the connection suspension indication.

When the indication type includes the base station supporting CP optimization indication, it is determined whether to recommend using a CP optimization scheme or not in a NAS signaling for attachment based on the base station supporting CP optimization indication, or whether to use the CP optimization scheme when transmitting data and/or signaling based on the base station supporting CP optimization indication.

When the indication type includes the base station supporting UP optimization indication, it is determined whether to recommend using a UP optimization scheme or not in a NAS signaling for attachment based on the base station supporting UP optimization indication, or whether to use the UP optimization scheme when transmitting data and/or signaling based on the base station supporting UP optimization indication.

Optionally, the obtaining module can be configured to at least one of: recommend using the CP optimization scheme in the NAS signaling for attachment when the base station supporting CP optimization indication has a seventh predetermined value, or not using the CP optimization scheme in the NAS signaling for attachment when the base station supporting CP optimization indication has an eighth predetermined value; and recommend using the UP optimization scheme in the NAS signaling for attachment when the base station supporting UP optimization indication has a ninth predetermined value, or not using the UP optimization scheme in the NAS signaling for attachment when the base station supporting UP optimization indication has a tenth predetermined value.

Optionally, the obtaining module can be configured to when the NAS is currently in the idle state without the suspension flag: send a NAS signaling 1 or 3 to the AS and requesting the AS to establish a connection initially when the base station supporting CP optimization indication has a seventh predetermined value, or send a NAS signaling 2 or 3 to the AS and requesting the AS to establish a connection initially when the base station supporting CP optimization indication has an eighth predetermined value.

Optionally, the obtaining module can be configured to when the NAS is currently in the idle state with the suspension flag: buffer a NAS signaling 2 or 3 to the AS and request the AS to establish a connection initially when the base station supporting UP optimization indication has a ninth predetermined value, or send a NAS signaling 2 or 3 to the AS and request the AS to establish a connection initially when the base station supporting UP optimization indication has a tenth predetermined value.

Optionally, the above NAS signaling 1 can, but not limited to, be a NAS signaling for data service request, the NAS signaling 2 can, but not limited to, be a NAS signaling for service request, and the NAS signaling 3 can, but not limited to, be a NAS signaling for tracking area update.

Optionally, the obtaining module can be configured to be used in one of the following situations.

When the suspension retention indication has a first predetermined value, the predetermined operation indicated by the suspension retention indication is performed. The predetermined operation includes one of: retaining the suspension flag, the NAS to be in an idle state with the suspension flag, entering the idle state with the suspension flag, and maintaining the idle state with the suspension flag.

When the suspension retention indication has a second predetermined value, the suspension flag is cleared, the NAS is to be in an idle state without the suspension flag, the NAS enters the idle state without the suspension flag, and the NAS leaves the idle state with the suspension flag.

When the NB-IoT terminal type indication has a third predetermined value, the terminal type of the terminal is obtained, as an NB-IoT terminal.

When the NB-IoT terminal type indication has a fourth predetermined value, the terminal type of the terminal is obtained, as a non-NB-IoT terminal.

When the NAS signaling handling indication has a fifth predetermined value, the buffered NAS signaling is sent to the AS of the terminal.

When the NAS signaling handling indication has a sixth predetermined value, the buffered NAS signaling is not sent to the AS of the terminal.

It should be noted that each of the above-described modules can be implemented by means of software or hardware, and the latter can be implemented by, but not limited to, the following manner: the above-mentioned modules are located at the same processor, or the above-mentioned modules are distributed over a plurality of processors.

Embodiment 8

According to an embodiment of the present disclosure, an apparatus for connection handling is also provided. The apparatus can implement the above embodiments and preferable embodiments, and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 17:
FIG. 17 is a fifth block diagram showing a structure of an apparatus for connection handling according to an embodiment of the present disclosure.

FIG. 17 is a fifth block diagram showing a structure of an apparatus for connection handling according to an embodiment of the present disclosure. As shown in FIG. 17, the apparatus includes: 1) A second transmitting module 172 configured to transmit a first downlink message and/or a first resume identity to a terminal. The first resume identity is to be used by the terminal for transmitting an uplink message and/or a second resume identity based on the first resume identity.

Optionally, the above apparatus for connection handling can, but not limited to, be applied in a UP optimization scenario, e.g., a UP optimization in MTC.

Optionally, the above apparatus for connection handling can, but not limited to, be applied in base station, e.g., a macro base station, a micro base station, a pico base station or a home base station.

With the above steps, a second transmitting module transmits a first downlink message and/or a first resume identity to a terminal. A fourth receiving module receives an uplink message and/or a second resume identity transmitted from the terminal based on the first resume identity. It can be seen that, with the above solution, it is possible to receive the second resume identity transmitted from the terminal based on the first resume identity. In this way, the consistency in operations between the terminal and the base station can be achieved and the problems associated with inconsistent operations in the user plane optimization in the related art can be solved.

In this embodiment, the terminal can transmit the uplink message and/or the second resume identity to the base station transmitting the first resume identity, or to another base station.

Figure 18:
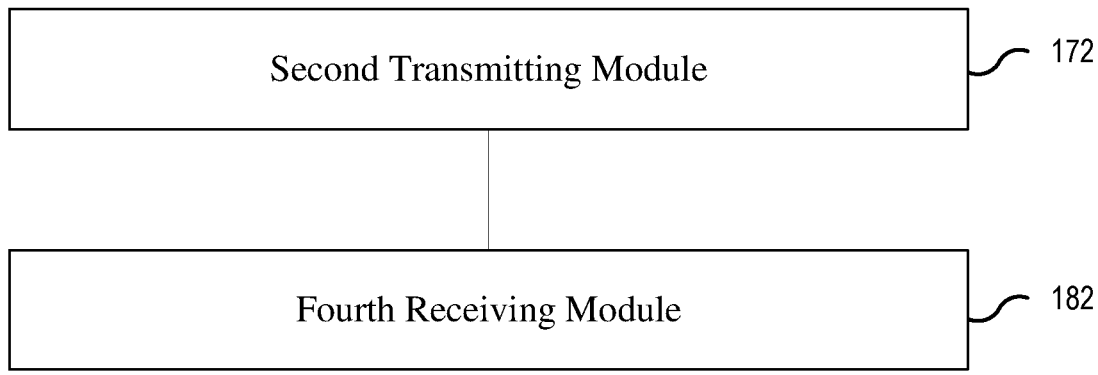
FIG. 18 is a sixth block diagram showing a structure of an apparatus for connection handling according to an embodiment of the present disclosure.

FIG. 18 is a sixth block diagram showing a structure of an apparatus for connection handling according to an embodiment of the present disclosure. As shown in FIG. 18, optionally the apparatus can further include: a fourth receiving module 182 coupled to the second transmitting module and configured to receive the uplink message and/or the second resume identity transmitted from the terminal based on the first resume identity.

It is to be noted here that, the base station that receives the uplink message and/or the second resume identity transmitted from the terminal based on the first resume identity can be the base station transmitting the first resume identity, or another base station.

Optionally, the first downlink message can, as a non-limiting example, carry information indicating a format of the first resume identity transmitted to the terminal.

Optionally, the information indicating the format of the first resume identity can, as a non-limiting example, include: information indicating a meaning of information carried in the first resume identity and information indicating a length of the information carried in the first resume identity.

Optionally, the first downlink message can, as a non-limiting example, include information indicating at least two of: a total length of the first resume identity being a first predetermined length, a length of base station information carried in the first resume identity being a second predetermined length, and a length of terminal information carried in the first resume identity being a third predetermined length.

Optionally, the first downlink message includes two of the first predetermined length, the second predetermined length and the third predetermined length, and the method can, as a non-limiting example, further include: obtaining, based on the two of the first predetermined length, the second predetermined length and the third predetermined length included in the first downlink message, the other one of the first predetermined length, the second predetermined length and the third predetermined length.

Optionally, the uplink message can, as a non-limiting example, carry information indicating a format of the second resume identity transmitted from the terminal.

Figure 19:
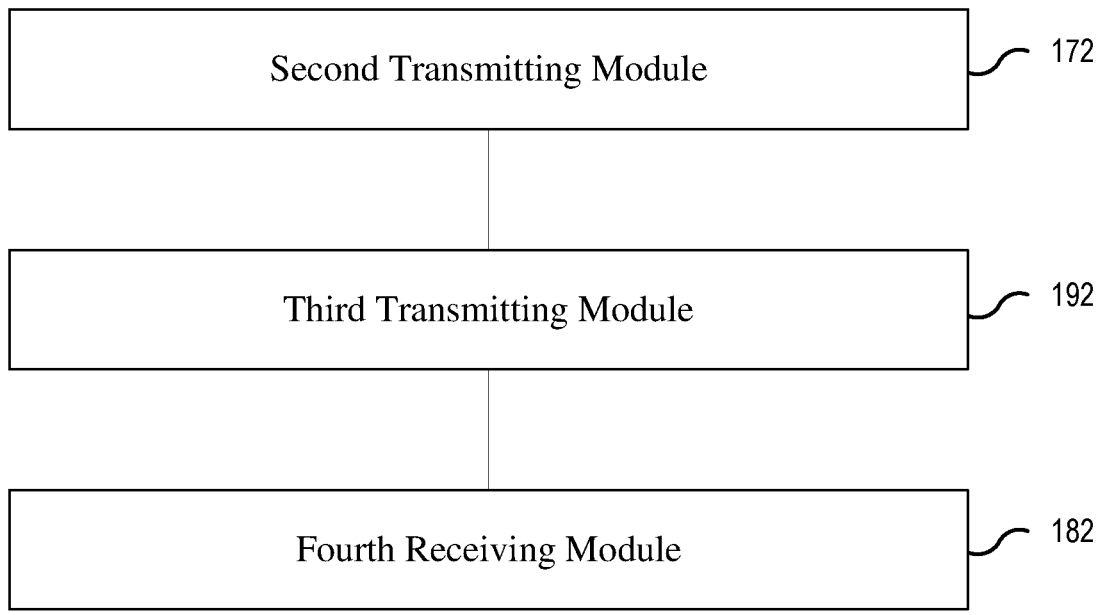
FIG. 19 is a seventh block diagram showing a structure of an apparatus for connection handling according to an embodiment of the present disclosure.

FIG. 19 is a seventh block diagram showing a structure of an apparatus for connection handling according to an embodiment of the present disclosure. As shown in FIG. 19, optionally the apparatus can further include: a third transmitting module 192 coupled between the second transmitting module 172 and the fourth receiving module 182, and configured to transmit to the terminal a second downlink message carrying information indicating a format of the second resume identity.

It is to be noted here that, the base station that transmits the second downlink message to the terminal can be the base station transmitting the first resume identity, or another base station.

Optionally, the second downlink message can, as a non-limiting example, include information indicating at least two of: a total length of the second resume identity being a seventh predetermined length, a length of base station information carried in the second resume identity being an eighth predetermined length, and a length of terminal information carried in the second resume identity being a ninth predetermined length.

Optionally, the uplink message includes two of the seventh predetermined length, the eighth predetermined length and the ninth predetermined length, and the solution can, as a non-limiting example, further include: obtaining, based on the two of the seventh predetermined length, the eighth predetermined length and the ninth predetermined length included in the uplink message, the other one of the seventh predetermined length, the eighth predetermined length and the ninth predetermined length.

Optionally, the second downlink message can, as a non-limiting example, include one of: system information, a Message 2 for allocating to the terminal resources required for transmission of the connection resumption request message, and a Message 4 for allocating to the terminal resources required for transmission of the connection resumption request message.

It should be noted that each of the above-described modules can be implemented by means of software or hardware, and the latter can be implemented by, but not limited to, the following manner: the above-mentioned modules are located at the same processor, or the above-mentioned modules are distributed over a plurality of processors.

In the following, alternative embodiments of the present disclosure will be explained in detail.

In an embodiment of the present disclosure, a method for improving AS-NAS interactions in a terminal in the UP optimization scheme is provided.

Optionally, one or more new indications (i.e., the first indication message(s)) transmitted from the AS of the terminal to the NAS of the terminal can be defined. The indication(s) can be explicit, or can be implicit, e.g., information included in another indication (e.g., the third indication message) indicating a connection result for transmission to the NAS.

Optionally, in the example where the suspension retention indication is Indication 1, the indication can have a value of c1 (i.e., the first predetermined value), instructing the NAS to maintain the idle state with the suspension flag and hold the stored NAS context information, or a value of c2 (i.e., the second predetermined value), instructing the NAS to clear the suspension indication directly and return to the normal idle state.

Optionally, Indication 1 can be a 1-bit value. In this case c1 can be 1 and c2 can be 0.

Optionally, Indication 1 can be sent to the NAS along with another indication indicating the connection result, or the information contained in Indication 1 can be included in another indication indicating the connection result for transmission to the NAS.

Optionally, the other indication indicating the connection result can be a resumption failure indication.

Optionally, the other indication that includes the information of Indication 1 and indicates the connection establishment or resumption result can have the form of "failure to resume with suspend" or "failure to resume without suspend".

Optionally, the AS of the terminal can send Indication 1 or another indication including the information of Indication 1 to the NAS in at least one the following scenarios: the AS of the terminal being unable to transmit a connection resumption request message (Msg3) for failing to pass an Access Barring test, the AS of the terminal receiving a connection rejection message carrying suspension information, the AS of the terminal receiving a reestablishment rejection message carrying suspension information, and timeout of a timer started after the AS of the terminal has transmitted a Msg3 (e.g., a connection resumption request message or a reestablishment message). Optionally, Indication 1 can have a value of c1.

Optionally, in the example where the Narrow Band Internet of Things (NB-IoT) terminal type indication is Indication 2, the indication can have a value of d1 (i.e., the third predetermined value), indicating that the terminal is an NB-IoT terminal (NB-IoT UE), or a value of d2 (i.e., the fourth predetermined value), indicating that the terminal is a non-NB-IoT terminal (non-NB-IoT UE).

Optionally, Indication 2 can be a 1-bit value. In this case d1 can be 1 and d2 can be 0.

Optionally, Indication 2 can be sent to the NAS along with another indication indicating the connection establishment or resumption result, or the information contained in Indication 2 can be included in another indication indicating the connection establishment or resumption result for transmission to the NAS.

Optionally, the other indication indicating the connection result can be a resumption failure indication.

Optionally, the AS of the terminal can send Indication 2 or another indication including the information of Indication 2 to the NAS in at least one the following scenarios: the AS of the terminal transferring an extended wait timer to the NAS in response to receiving a connection rejection message, and the terminal changing the value based on an actual feature setting of its own.

Optionally, in the example where the NAS signaling handling indication is Indication 3 for instructing the NAS to or not to send a buffered NAS signaling to the AS of the terminal, the indication can have a value of e1 (i.e., the fifth predetermined value), indicating that the NAS shall send the buffered NAS signaling to the AS, or a value of e2 (i.e., the sixth predetermined value), indicating that the NAS does not need to send the buffered NAS signaling to the AS.

Optionally, Indication 3 can be a 1-bit value. In this case e1 can be 1 and e2 can be 0.

Optionally, Indication 3 can be sent to the NAS along with another indication indicating the connection establishment or resumption result, or the information contained in Indication 3 can be included in another indication indicating the connection establishment or resumption result for transmission to the NAS.

Optionally, the other indication indicating the connection result can be a resumption failure indication.

Optionally, the AS of the terminal can send Indication 3 or another indication including the information of Indication 3 to the NAS in at least one the following scenarios: the AS of the terminal being unable to transmit a connection resumption request message (Msg3) as a current serving base station does not support the UP optimization scheme, and the AS of the terminal being unable to transmit a connection resumption request message (Msg3) as there is no AS context information stored. Optionally, Indication 1 can have a value of e1.

In an alternative embodiment of the present disclosure, a method for improving transmission of a resume identity in the UP optimization scheme is provided.

Optionally, when transmitting a first resume identity (which is e.g., a downlink resume identity hereinafter) to a terminal, a base station indicates a specific format of the downlink resume identity.

Optionally, the base station indicates meanings and lengths of the respective portions of information in the downlink resume identity.

Optionally, the base station indicates at least two of: a total length x1 (i.e., the first predetermined length) of the downlink resume identity; a length x2 (i.e., the second predetermined length) of base station information contained in the downlink resume identity; and a length x3 (i.e., the third predetermined length) of terminal/user information contained in the downlink resume identity.

In an alternative embodiment of the present disclosure, a method controlled by a terminal for indicating a format of a second resume identity (which is e.g., an uplink resume identity hereinafter) is provided.

Optionally, the terminal indicates meanings and lengths of the respective portions of information in the uplink resume identity.

Optionally, while the terminal transmits the uplink resume identity, length indication information is included. Optionally, the information indicates at least two of: a total length y1 (i.e., the fourth predetermined length) of the uplink resume identity; a length y2 (i.e., the fifth predetermined length) of base station information contained in the uplink resume identity; and a length y3 (i.e., the sixth predetermined length) of terminal/user information contained in the uplink resume identity. When only two of the above lengths are included, the other length can be derived from the two lengths. For example, if the total length y1 of the uplink resume identity and the length y2 of base station information contained in the uplink resume identity are carried, the length of terminal/user information contained in the uplink resume identity can be simply derived as y3=y1-y2.

Optionally, the terminal can extract, from the base station information having the length of x2 in the downlink resume identity, base station information having the length of y2 from MSB to LSB for filling in the uplink resume identity.

Optionally, the terminal can extract, from the base station information having the length of x3 in the downlink resume identity, base station information having the length of y3 from MSB to LSB for filling in the uplink resume identity.

In an alternative embodiment of the present disclosure, a method controlled by a network side for indicating a format of a second resume identity (which is e.g., an uplink resume identity hereinafter) is provided.

Optionally, before transmitting a request message carrying an uplink resume identity, the terminal receives a downlink message transmitted from a base station first. The downlink message includes information indicating the format of the uplink resume identity.

Optionally, the information indicates at least two of: a total length z1 (i.e., the seventh predetermined length) of the uplink resume identity; a length z2 (i.e., the eighth predetermined length) of base station information contained in the uplink resume identity; and a length z3 (i.e., the ninth predetermined length) of terminal/user information contained in the uplink resume identity. When only two of the above lengths are included, the other length can be derived from the two lengths. For example, if the total length z1 of the uplink resume identity and the length z2 of base station information contained in the uplink resume identity are included, the length of terminal/user information contained in the uplink resume identity can be simply derived as z3=z1-z2.

Optionally, the terminal can extract, from the base station information having the length of x2 in the downlink resume identity, base station information having the length of z2 from MSB to LSB for filling in the uplink resume identity.

Optionally, the terminal can extract, from the base station information having the length of x3 in the downlink resume identity, base station information having the length of z3 from MSB to LSB for filling in the uplink resume identity.

Optionally, the downlink message transmitted from the base station to the terminal can include one of: system information, a Message 2 for allocating to the terminal resources required for transmission of the connection resumption request message, and a Message 4 for allocating to the terminal resources required for transmission of the connection resumption request message.

As discussed above, with the methods and apparatuses for connection handling according to the embodiments and alternative embodiments of the present disclosure, it is possible to ensure the consistency between the AS and NAS of the terminal in the UP optimization scheme, as well as the accuracy and flexibility in transmission of the resume identitys.

The above embodiments are provided for illustrating, rather than limiting, the solutions of the present disclosure. Various modifications or alternatives can be made to the solutions by those having ordinary skills in the art without departing from the spirit and scope of the present disclosure. The scope of the present disclosure is defined only by the claims as attached.

Embodiment 9

Figure 20:
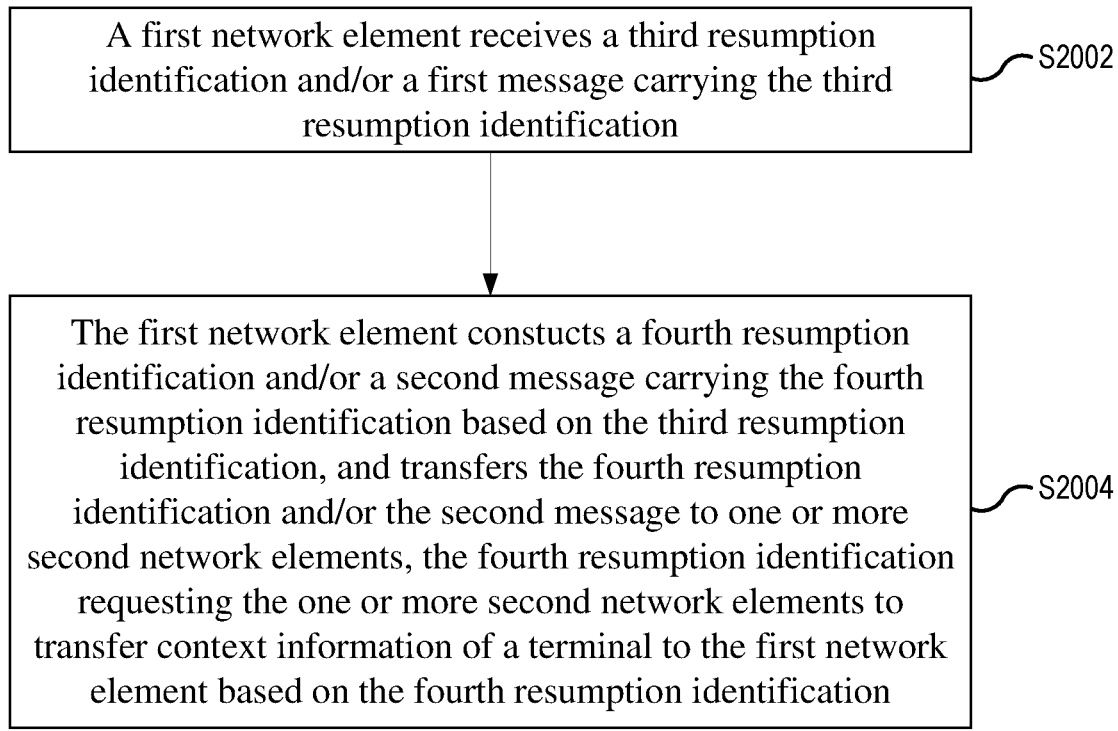
FIG. 20 is a fifth flowchart illustrating a method for connection handling according to an embodiment of the present disclosure.

In this embodiment, a method for connection handling is provided. FIG. 20 is a fifth flowchart illustrating a method for connection handling according to an embodiment of the present disclosure. As shown in FIG. 20, the process flow includes the following steps.

At step S2002, a first network element receives a third resume identity and/or a first message carrying the third resume identity.

At step S2004, the first network element constructs a fourth resume identity and/or a second message carrying the fourth resume identity based on the third resume identity, and transfers the fourth resume identity and/or the second message to one or more second network elements. The fourth resume identity requests the one or more second network elements to transfer context information of a terminal to the first network element based on the fourth resume identity.

Optionally, the above method for connection handling can, but not limited to, be applied in a UP optimization scenario, e.g., a UP optimization in MTC.

With the above steps, a first network element receives a third resume identity and/or a first message carrying the third resume identity. The first network element constructs a fourth resume identity and/or a second message carrying the fourth resume identity based on the third resume identity, and transfers the fourth resume identity and/or the second message to one or more second network elements. The fourth resume identity requests the one or more second network elements to transfer context information of a terminal to the first network element based on the fourth resume identity. It can be seen that, with the above solution, the first network element can obtain the context information of the terminal transferred from the one or more second network elements based on the third resume identity, such that the first network element and the second element can have the consistency context information of the terminal and the problems associated with inconsistent operations in the user plane optimization in the related art can be solved.

In this embodiment, the first network element can, as a non-limiting example, include one of: a first Mobility Management Entity (MME), a first base station, a first cell, a target MME, a target base station, a target cell, an MME to which the terminal initiates a connection resumption, a base station to which the terminal initiates a connection resumption, and a cell to which the terminal initiates a connection resumption. The second network element can, as a non-limiting example, include one of: a second MME, a second base station, a second cell, a source MME, a source base station, a source cell, an MME storing context information of the terminal, a base station storing context information of the terminal, and a cell storing context information of the terminal.

In this embodiment, the first message can, as a non-limiting example, include an air interface connection resumption request message, "RRCConnectionResumeRequest Message". The second message can, as a non-limiting example, include one of: an X2 interface retrieving terminal context information request message, "X2 RETRIEVE UE CONTEXT REQUEST", and an S1 interface retrieving terminal context information request message.

In this embodiment, the third resume identity and the fourth resume identity can be the same or different.

Optionally, the second message can, as a non-limiting example, carry information indicating a format of the fourth resume identity and/or a coding rule for the fourth resume identity.

Optionally, the fourth resume identity can, as a non-limiting example, carry information indicating a format of the fourth resume identity and/or a coding rule for the fourth resume identity.

Optionally, the information indicating the format of the fourth resume identity and/or the coding rule for the fourth resume identity can, as a non-limiting example, include at least one of: information indicating a meaning of information carried in the fourth resume identity, and information indicating a length of the information carried in the fourth resume identity.

Optionally, the format of the fourth resume identity and/or the coding rule for the fourth resume identity can, as a non-limiting example, include at least one of:

a total length of the fourth resume identity, a length of effective bits in the fourth resume identity, a starting position of effective bits carried in the fourth resume identity, or an offset between the starting position of the effective bits and a first predetermined position, whether the fourth resume identity carries base station information, whether the fourth resume identity carries terminal information, a length of the base station information carried in the fourth resume identity, a length of the terminal information carried in the fourth resume identity, a starting position of the base station information in the fourth resume identity or an offset between the starting position of the base station information and a second predetermined position, a starting position of the terminal information in the fourth resume identity or an offset between the starting position of the terminal information and a third predetermined position, a total length of the base station information and the terminal information carried in the fourth resume identity, a starting position of the base station information and the terminal information in the fourth resume identity or an offset between the starting position of the base station information and the terminal information and a fourth predetermined position, whether the fourth resume identity carries predetermined information, a meaning of the predetermined information carried in the fourth resume identity, a length of the predetermined information carried in the fourth resume identity, a starting position of the predetermined information carried in the fourth resume identity or an offset between the starting position of the predetermined information and a fifth predetermined position, a total length of the base station information, the terminal information and the predetermined information in the fourth resume identity, a starting position of the base station information, the terminal information and the predetermined information in the fourth resume identity, or an offset between the starting position of the base station information, the terminal information and the predetermined information and a sixth predetermined position.

Embodiment 10

According to an embodiment of the present disclosure, an apparatus for connection handling is provided. The apparatus is applied in a first network element. The apparatus can implement the above embodiments and preferable embodiments, and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 21:
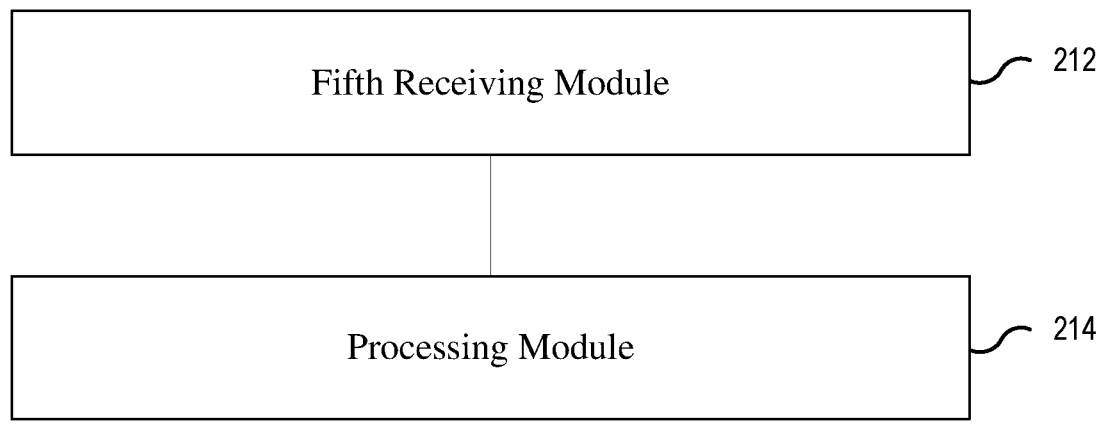
FIG. 21 is an eighth block diagram showing a structure of an apparatus for connection handling according to an embodiment of the present disclosure.

FIG. 21 is an eighth block diagram showing a structure of an apparatus for connection handling according to an embodiment of the present disclosure. As shown in FIG. 21, the apparatus includes the following modules.

A fifth receiving module 212 is configured to receive a third resume identity and/or a first message carrying the third resume identity.

A processing module 214 is coupled to the fifth receiving module 212 and configured to construct a fourth resume identity and/or a second message carrying the fourth resume identity based on the third resume identity, and transfer the fourth resume identity and/or the second message to one or more second network elements. The fourth resume identity requests the one or more second network elements to transfer context information of a terminal to the first network element based on the fourth resume identity.

Optionally, the above apparatus for connection handling can, but not limited to, be applied in a UP optimization scenario, e.g., a UP optimization in MTC.

With the above apparatus, a fifth receiving module 212 receives a third resume identity and/or a first message carrying the third resume identity. A processing module constructs a fourth resume identity and/or a second message carrying the fourth resume identity based on the third resume identity, and transfers the fourth resume identity and/or the second message to one or more second network elements. The fourth resume identity requests the one or more second network elements to transfer context information of a terminal to the first network element based on the fourth resume identity. It can be seen that, with the above solution, the first network element can obtain the context information of the terminal transferred from the one or more second network elements based on the third resume identity, such that the first network element and the second element can have the consistency context information of the terminal and the problems associated with inconsistent operations in the user plane optimization in the related art can be solved.

In this embodiment, the first network element can, as a non-limiting example, include one of: a first Mobility Management Entity (MME), a first base station, a first cell, a target MME, a target base station, a target cell, an MME to which the terminal initiates a connection resumption, a base station to which the terminal initiates a connection resumption, and a cell to which the terminal initiates a connection resumption. The second network element can, as a non-limiting example, include one of: a second MME, a second base station, a second cell, a source MME, a source base station, a source cell, an MME storing context information of the terminal, a base station storing context information of the terminal, and a cell storing context information of the terminal.

In this embodiment, the first message can, as a non-limiting example, include an air interface connection resumption request message, "RRCConnectionResumeRequest Message". The second message can, as a non-limiting example, include one of: an X2 interface retrieving terminal context information request message, "X2 RETRIEVE UE CONTEXT REQUEST", and an S1 interface retrieving terminal context information request message.

In this embodiment, the third resume identity and the fourth resume identity can be the same or different.

Optionally, the second message can, as a non-limiting example, carry information indicating a format of the fourth resume identity and/or a coding rule for the fourth resume identity.

Optionally, the fourth resume identity can, as a non-limiting example, carry information indicating a format of the fourth resume identity and/or a coding rule for the fourth resume identity.

Optionally, the information indicating the format of the fourth resume identity and/or the coding rule for the fourth resume identity can, as a non-limiting example, include at least one of: information indicating a meaning of information carried in the fourth resume identity, and information indicating a length of the information carried in the fourth resume identity.

Optionally, the format of the fourth resume identity and/or the coding rule for the fourth resume identity can, as a non-limiting example, include at least one of:

a total length of the fourth resume identity, a length of effective bits in the fourth resume identity, a starting position of effective bits carried in the fourth resume identity, or an offset between the starting position of the effective bits and a first predetermined position, whether the fourth resume identity carries base station information, whether the fourth resume identity carries terminal information, a length of the base station information carried in the fourth resume identity, a length of the terminal information carried in the fourth resume identity, a starting position of the base station information in the fourth resume identity or an offset between the starting position of the base station information and a second predetermined position, a starting position of the terminal information in the fourth resume identity or an offset between the starting position of the terminal information and a third predetermined position, a total length of the base station information and the terminal information carried in the fourth resume identity, a starting position of the base station information and the terminal information in the fourth resume identity or an offset between the starting position of the base station information and the terminal information and a fourth predetermined position, whether the fourth resume identity carries predetermined information, a meaning of the predetermined information carried in the fourth resume identity, a length of the predetermined information carried in the fourth resume identity, a starting position of the predetermined information carried in the fourth resume identity or an offset between the starting position of the predetermined information and a fifth predetermined position, a total length of the base station information, the terminal information and the predetermined information in the fourth resume identity, a starting position of the base station information, the terminal information and the predetermined information in the fourth resume identity, or an offset between the starting position of the base station information, the terminal information and the predetermined information and a sixth predetermined position.

Embodiment 11

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present disclosure, in essence or in terms of parts contributing to the prior art, can be embodied in the form of a software product, which is stored in a storage medium (e.g., ROM/RAM, disc, CD-ROM) and includes a number of instructions for enabling a terminal device (which can be a mobile phone, a computer, a server, or a network device, etc.) to perform the method described in the various embodiments of the present disclosure.

In an embodiment of the present disclosure, a storage medium is provided.

Optionally, in this embodiment, the storage medium can store program codes, which, when executed, perform the following steps.

At step S11, a connection request is received. The connection request requests for establishing or resuming a connection with a base station.

At step S12, a Non-Access Stratum (NAS) of a terminal is instructed to perform a predetermined operation based on an obtained first connection result corresponding to the connection request.

Optionally, the storage medium can further store program codes, which, when executed, perform the method steps according to the above embodiments.

At step S21, a first downlink message and/or a first resume identity transmitted from a first base station is received.

At step S22, an uplink message and/or a second resume identity is transmitted to a second base station based on the first resume identity.

Optionally, the storage medium can further store program codes, which, when executed, perform the method steps according to the above embodiments.

At step S31, indication information transmitted from an Access Stratum (AS) of a terminal is obtained. The indication information instructs a Non-Access Stratum (NAS) of the terminal to perform a predetermined operation.

At step S32, the predetermined operation is performed based on the indication information.

Optionally, the storage medium can further store program codes, which, when executed, perform the method steps according to the above embodiments.

At step S41, a first downlink message and/or a first resume identity is sent to a terminal.

Optionally, the storage medium can further store program codes, which, when executed, perform the method steps according to the above embodiments.

At step S51, a first network element receives a third resume identity and/or a first message carrying the third resume identity.

At step S52, the first network element constructs a fourth resume identity and/or a second message carrying the fourth resume identity based on the third resume identity, and transfers the fourth resume identity and/or the second message to one or more second network elements. The fourth resume identity requests the one or more second network elements to transfer context information of a terminal to the first network element based on the fourth resume identity.

Alternatively, in this embodiment, the above-described storage medium can include, but not limited to, a USB disk, a Read-Only Memory (ROM), a Random Access Memory (RAM), a mobile hard disk, a magnetic disc or CD-ROM and other media that can store program codes.

Optionally, in this embodiment, the processor executes the method steps of the above embodiments in accordance with the program codes stored in the storage medium.

Optionally, regarding the specific examples in this embodiment, reference can be made to the above embodiments and the examples described in optional embodiments, and the details thereof will be omitted here.

It will be apparent to those skilled in the art that the above-described modules or steps of the present disclosure can be implemented by means of a general purpose computing device, and can be placed at a single computing device or distributed over a network of multiple computing devices. Optionally, they can be implemented by means of program code executable by the computing device, so that they can be stored in a storage device and executed by a computing device, and in some cases, they can be performed in a different order from the steps shown or described here, or they can be made separately into individual integrated circuit modules, or can be implemented by making multiple modules or steps therein into a single integrated circuit module. Thus, the present disclosure is not limited to any particular hardware, software, and the combination thereof.

The foregoing is merely illustrative of the preferred embodiments of the present disclosure and is not intended to limit the present disclosure. Various changes and modifications can be made by those skilled in the art. Any modifications, equivalent substitutions, improvements, and the like within the spirit and principles of the disclosure are intended to be included within the scope of the present disclosure.

INDUSTRIAL APPLICABILITY

As described above, the embodiments of the present disclosure provide a method and an apparatus for connection handling, capable of solving at least the problems associated with inconsistent operations in the UP optimization in the related art and providing consistency in operations between the AS and NAS of the terminal.

What is claimed is:

1. A wireless communication method, comprising:
   initiating, by a terminal device, a connection resume procedure to resume a connection with a base station;
   receiving, by a Non-Access Stratum (NAS) layer of the terminal device, information about a failure to resume the connection with the base station from an Access Stratum (AS) layer of the terminal device upon the AS layer receiving a connection rejection message from the base station; and
   entering an idle state by the terminal device in response to the failure to resume the connection,
   wherein the method further comprises:
   releasing, by the terminal device, stored context information in response to a suspend indication being omitted in the connection rejection message, the suspending indication indicating whether the connection has been suspended.

2. The method of claim 1, further comprising:
   maintaining, by the terminal device stored context information in response to a presence of the suspend indication in the connection rejection message.

3. The method of claim 1, further comprising:
   determining, by a terminal device while in the idle state, that an access to a cell is barred as a result of an access barring check.

4. The method of claim 1, further comprising:
   transferring an extended wait timer to the NAS layer of the terminal device after receiving the connection rejection message.

5. A wireless communication method, comprising:
   performing, by a base station, a connection resume procedure initiated by a terminal device to resume a connection with the base station; and
   informing a Non-Access Stratum (NAS) layer of the terminal device of a failure to resume the connection with the base station by transmitting a connection rejection message to an Access Stratum (AS) layer of the terminal device to enable the terminal device to enter an idle state,
   wherein a suspend indication indicating whether the connection has been suspended is omitted in the connection rejection message to enable the terminal device to enter the idle state without the suspend indication.

6. The method of claim 5, wherein the suspend indication indicating whether the connection has been suspended is included in the connection rejection message to enable the terminal device to enter the idle state with the suspend indication.

7. The method of claim 5, wherein the terminal device comprises a Narrow Band-Internet of Things (NB-IoT) terminal device.

8. The method of claim 5, wherein a connection request message that initiates the connection resume procedure comprises a Radio Resource Control (RRC) Connection Request message.

9. A wireless communications apparatus comprising a processor that is configured to:
   initiate a connection resume procedure to resume a connection with a base station;
   receive a Non-Access Stratum (NAS) layer information about a failure to resume the connection with the base station from an Access Stratum (AS) layer upon the AS layer receiving a connection rejection message from the base station; and
   enter an idle state in response to the failure to resume the connection,
   wherein the processor is further configured to:
   maintain stored context information in response to a presence of a suspend indication in the connection rejection message, the suspend indication indicating whether the connection has been suspended; and
   release stored context information in response to the suspend indication being omitted in the connection rejection message.

10. The apparatus of claim 9, wherein the processor is configured to determine, while in the idle state, that an access to a cell is barred as a result of an access barring check.

11. The apparatus of claim 9, wherein the processor is configured to transfer an extended wait timer to the NAS layer after receiving the connection rejection message.

12. A wireless communications apparatus comprising a processor that is configured to:
- perform a connection resume procedure initiated by a terminal device to resume a connection with the apparatus; and
- inform a Non-Access Stratum (NAS) layer of the terminal device of a failure to resume the connection by transmitting a connection rejection message to an Access Stratum (AS) layer of the terminal device to enable the terminal device to enter an idle state,
- wherein a suspend indication that indicates whether the connection has been suspended being included in the connection rejection message enables the terminal device to enter the idle state with the suspend indication and the suspend indication being omitted in the connection rejection message enables the terminal device to enter the idle state without the suspend indication.

13. The apparatus of claim 12, wherein the terminal device comprises a Narrow Band-Internet of Things (NB-IoT) terminal device.

14. The apparatus of claim 12, wherein a connection request message that initiates the connection resume procedure comprises a Radio Resource Control (RRC) Connection Request message.

\* \* \* \* \*